United States Patent [19]
Robinson et al.

[11] 3,850,787
[45] *Nov. 26, 1974

[54] MANUFACTURE OF FLAT GLASS UTILIZING A REACTION TO TRACTION ACROSS THE WIDTH OF THE MOLTEN GLASS

[75] Inventors: Albert Sidney Robinson, Birkdale, Southport; David Gordon Loukes, Eccleston Park, Prescot; Jack Lawrenson, Windle, St. Helens, all of England

[73] Assignee: Pilkington Brothers Limited, Lancashire, England

[ * ] Notice: The portion of the term of this patent subsequent to Nov. 6, 1990, has been disclaimed.

[22] Filed: Sept. 11, 1972

[21] Appl. No.: 287,713

[30] Foreign Application Priority Data
Sept. 16, 1971 Great Britain................... 43269/71

[52] U.S. Cl...................... 161/165, 65/91, 65/99 A, 65/182 R
[51] Int. Cl............................................ C03b 18/02
[58] Field of Search ...... 65/99 A, 91, 182 R; 161/1, 161/165

[56] References Cited
UNITED STATES PATENTS

| | | | |
|---|---|---|---|
| 3,486,873 | 12/1969 | D'eustacjop | 65/99 A X |
| 3,489,543 | 1/1970 | Kiba et al. | 65/99 A X |
| 3,492,107 | 1/1970 | Simpson et al. | 65/99 A |
| 3,496,736 | 2/1970 | Hurwitz et al. | 65/99 A |
| 3,520,672 | 7/1970 | Greenler et al. | 65/99 A X |
| 3,582,302 | 6/1971 | Kiba et al. | 65/99 A |
| 3,618,623 | 11/1971 | Boaz | 65/99 A X |
| 3,718,450 | 2/1973 | Ohsato et al. | 65/99 A |
| 3,721,543 | 3/1973 | Classer et al. | 65/99 A X |

*Primary Examiner*—S. Leon Bashore
*Assistant Examiner*—Kenneth M. Schor
*Attorney, Agent, or Firm*—Burns, Doane, Swecker & Mathis

[57] ABSTRACT

Molten glass is poured on to a bath of molten metal to form a pool of molten glass on the bath, which pool is held back on the bath surface by an elongate member which can be solid, wetted by the glass, extending across the downstream end of the pool. A ribbon of glass is drawn from a forward flow of molten glass beneath the member and the ribbon is rapidly cooled to stabilize its dimensions as it is drawn away from the member. The glass is heated in the region of the member to maintain forwardly flowing glass in that region at a viscosity which is lower than the viscosity of molten glass of the pool upstream of the member but at viscosity at which the glass also wets on to the member. The ribbon is drawn from the lower viscosity, forwardly flowing glass.

The method is suitable for the production of flat glass of thickness in the range 0.5 mm to 10 mm; also the production of glass foil of thickness in the range 0.005 mm to 0.5 mm.

34 Claims, 23 Drawing Figures

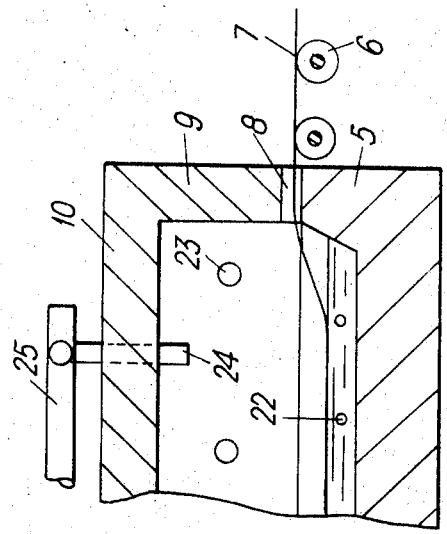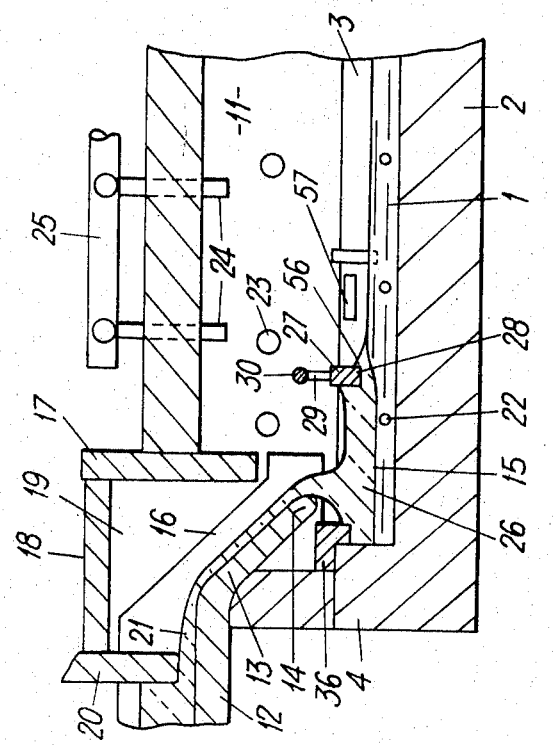
Fig. 1.

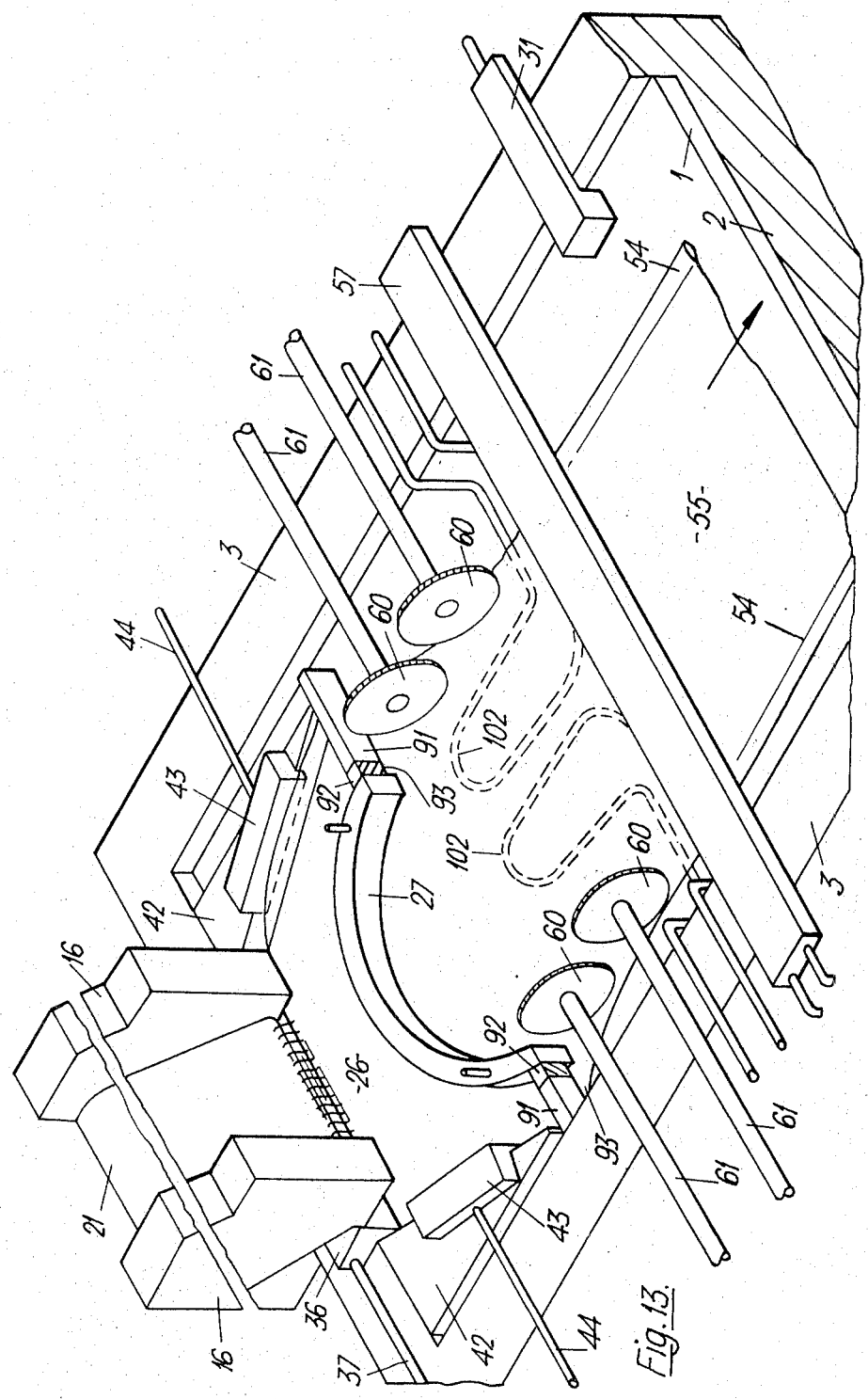

MANUFACTURE OF FLAT GLASS UTILIZING A REACTION TO TRACTION ACROSS THE WIDTH OF THE MOLTEN GLASS

BACKGROUND OF THE INVENTION

1. Field of the Invention

This invention relates to the manufacture of flat glass by a method in which glass in ribbon form is produced on a molten metal support.

2. Description of the Prior Art

Flat glass in ribbon form has been produced on a bath of molten metal by the float process in which a buoyant body of molten glass is formed on a molten metal bath and that body is advanced in ribbon form along the bath. The temperature regime to which the advancing glass is subjected can be controlled in relation to tractive forces applied to the ultimate ribbon of glass at the outlet end of the bath and, by means of top rolls, to the margins of the glass as the ribbon is being formed. Regulation of these factors determines the thickness of the ribbon of glass produced. Only the margins of the upper surface of the ribbon of glass have been contacted while the glass is in a deformable state, although for surface modification of the glass its upper surface has been contacted by a body of molten material which does not impair the fire finished surface of the glass.

In some ways of operating when the glass has been thinned by traction operating from the outlet end of the bath, the margins of the buoyant body of molten glass which is formed at the hot end of the bath, have been caused to wet on to refractory members at the sides of the tank structure so as to provide a marginal reaction to the traction forces.

The present invention is based on a new concept of manufacturing thin flat glass on a molten metal support by providing a reaction to traction right across the width of the molten glass from which an ultimate glass ribbon is being drawn.

This new concept can be used for the manufacture of a wide range of thicknesses of flat glass from 10 mm thick down to glass foil 0.005 mm thick. More especially the present invention is adapted to the production of very thin flat glass and glass foil.

SUMMARY

Flat glass of thickness in the range 0.5 mm to 10 mm or glass foil of thickness in the range 0.005 mm to 0.5 mm is manufactured by pouring molten glass at a controlled rate on to a bath of molten metal to form a pool of molten glass on the bath, and controlling forward flow of molten glass from the pool by means of a solid member extending across the downstream end of the pool and contacted by the molten glass. The glass is heated in the region of that member further to regulate that forward flow, a ribbon of glass is drawn along the bath by accelerating the forward flow by traction applied to the ultimate glass ribbon acting against reaction forces distributed across the ribbon width and created by contact of the glass with the member, and the dimensions of the ribbon are stabilised as it is drawn along the bath away from the solid member.

The contact of the solid member with the glass is preferably a wetting contact, and preferably electrical heating of the glass is employed to regulate the viscosity of the glass flowing into the ribbon.

BRIEF DESCRIPTION OF THE DRAWINGS

FIG. 1 is a sectional elevation of apparatus according to the invention for the manufacture of flat glass on a bath of molten metal contained in a tank structure, FIG. 12 is a section on line XII—XII of FIG. 11, FIG. 13 is a perspective view, similar to FIG. 10, of another embodiment of the apparatus for manufacturing glass foil, FIG. 20 is a section on line XX—XX of FIG. 19.

DESCRIPTION OF THE PREFERRED EMBODIMENTS

Figure 2:
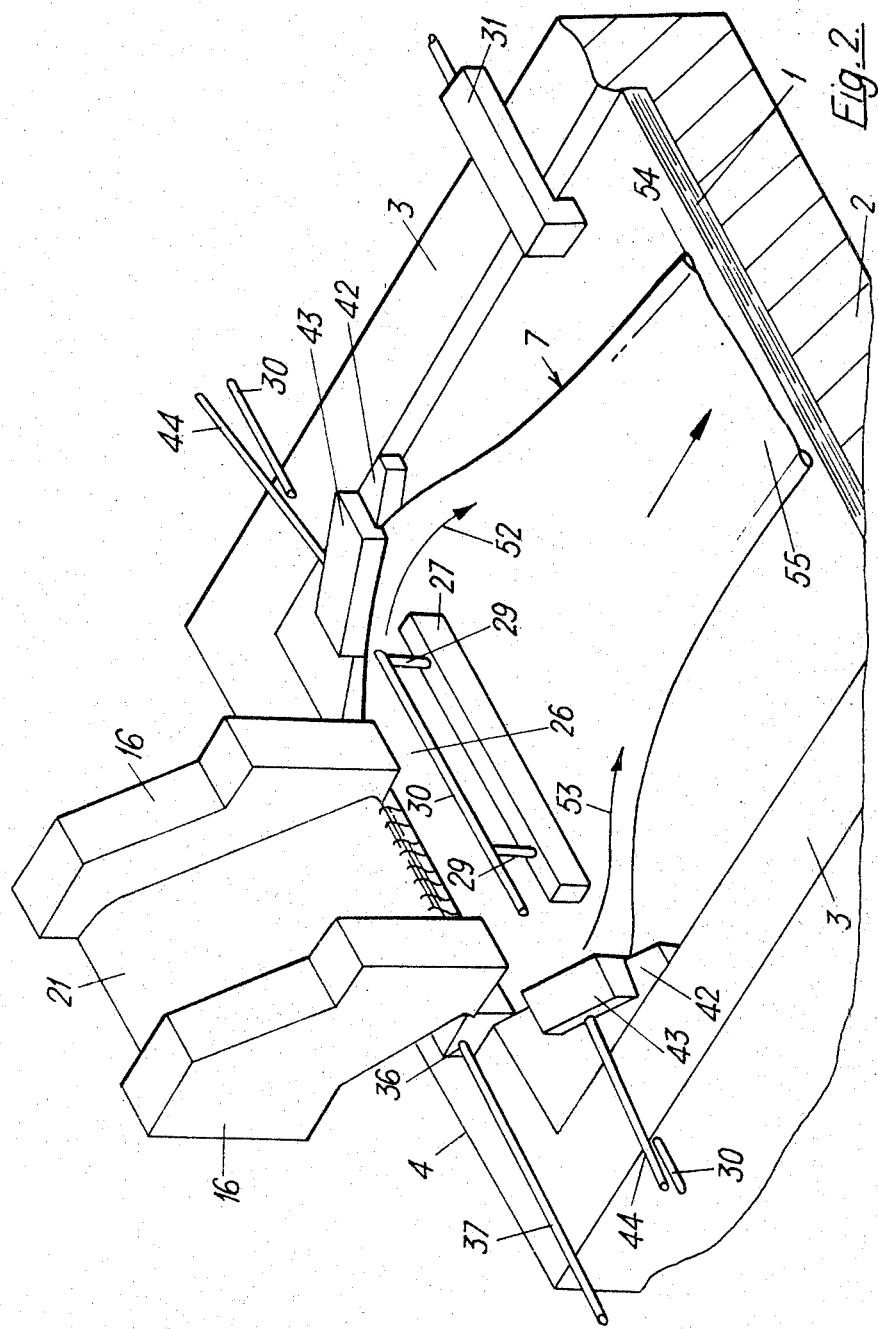
FIG. 2 is a perspective view of part of the apparatus of FIG. 1 where the ribbon of glass is formed.

In the drawings the same references indicate the same or similar parts.

Figure 3:
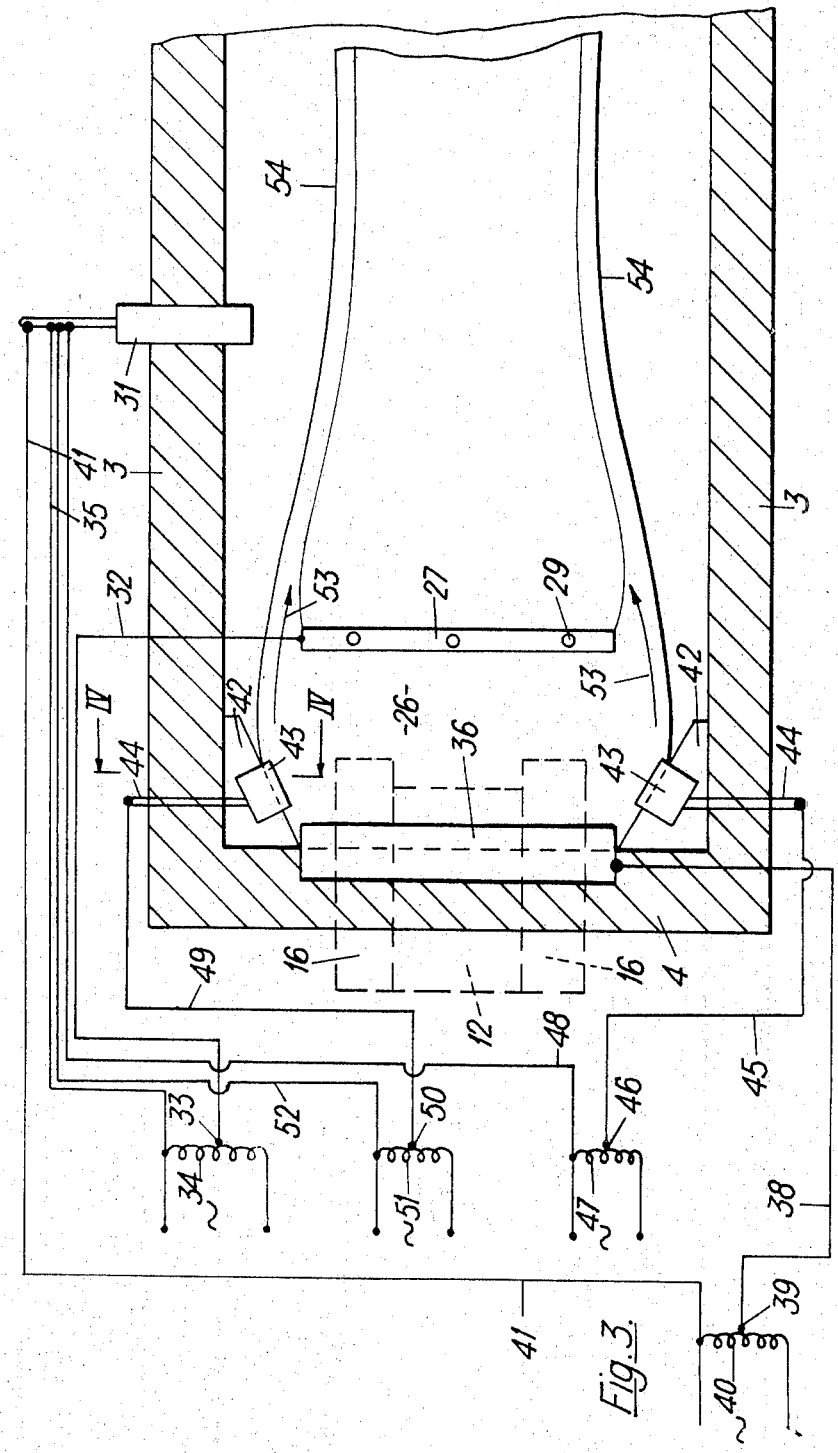
FIG. 3 is a plan view of the part of the tank structure illustrated in FIG. 2, showing the connection of electrical supplies to the apparatus.

Referring to FIGS. 1 to 3 of the drawings a bath of molten metal 1 is contained in a tank structure of elongated form comprising a floor 2, side walls 3, an end wall 4 at the inlet end of the bath and an end wall 5 at the outlet end of the bath.

Beyond the outlet end wall 5 there are mounted traction rollers 6 which act to convey the eventual ribbon of glass 7 through an outlet 8 from the tank structure 5 which outlet is defined between the end wall 5 and an end wall 9 of a roof structure 10 which is mounted above the tank structure and defines a headspace 11 above the bath 1 of molten metal. A spout 12 for pouring molten glass on to the bath surface is mounted to extend over the end wall 4. The spout 12 forms the termination of a channel extending from the forehearth of a glass melting furnace and the spout has a downwardly sloping lip 13 which ends at 14 close to the surface 15 of the bath 1 of molten metal. The spout and its downwardly slopping lip 13 have side jambs 16 so that the spout has a generally rectangular cross-section.

The roof structure is closed at the inlet end of the bath by a shut-off wall 17 and a roof extension 18 with side walls 19 provide a chamber enclosing the spout. A tweel 20 closes the chamber and is associated with the spout 12 to control the flow of molten glass 21 down the spout and on to the surface of the molten metal bath.

Temperature regulators 22 are immersed in the bath 1 of molten metal and temperature regulators 23 are provided in the headspace over the bath to control the temperature of the bath and of the glass which is advanced along the bath. A protective atmosphere for example a mixture of nitrogen and hydrogen is fed into the headspace over the bath through ducts 24 which are connected by headers 25 to a supply of the non-oxidising protective gas. The gas is maintained at a plenum in the headspace 11 and flows outwardly through the inlet and outlet to the bath thereby avoiding ingress of ambient atmosphere.

The molten glass, for example soda-lime-silica glass, pours over the end of the spout lip on to the bath surface to form a relatively deep pool 26 of molten glass on the bath surface. This pool is formed both by glass which is flowing forwardly along the bath and molten glass which spreads rearwardly beneath the spout up towards the end wall 4 of the tank structure.

An elongated solid member 27 of refractory material is parallel to and spaced from the spout lip 14 in a direction downstream of the bath and located at a distance above the bath surface 15 defining an elongated aperture 28 of varying cross section for flow of molten glass from the pool 26 of molten glass held back on the bath surface by the member 27.

In the embodiment of FIGS. 1 to 3 the solid member 27 is a straight bar of a refractory metal, preferably heat resistant stainless steel.

Alternatively the bar 27 may be made of carbon, molybdenum, tungsten, tantalum, niobium, iridium, ruthenium, or palladium, or platinum or stannic oxide when there is no hydrogen in the protective atmosphere. The bar is fixed to the bath surface by struts 29 which depend from a cross-beam 30 which is fixed into the side walls of the roof structure.

The lower surface of the bar is fixed at a height above the bath surface such that the aperture is from 18 mm to 7 mm high, being of varying cross-section due to the change in surface level of the bath from the lower level beneath the spout supporting the pool 26 of molten glass to the high level downstream of the bar 27, along which the ribbon of glass 7 is drawn. This change in surface level of the bath gives an uprising shape to the lower surface of the aperture 28. The upthrust exerted on the hot molten glass by the molten metal lower surface of the aperture, and the wetting of the molten glass on to the bar are factors which augment the viscous drag experienced by the molten glass as it is drawn through the aperture into the ribbon 7 which is continuously formed just downstream of the aperture 28.

Downstream of the location of the bar 27 there is a return electrode 31 made for example of heat resistant steel which extends over one of the side walls 3 of the tank structure and dips into the molten metal of the bath just in front of that side wall. The cross-beam 30 and the struts 29 are of electrically conductive material for example steel, and one end of the beams 20 is connected by a line 32 to a variable tapping on an autotransformer winding 34 which is connected across the mains supply. The neutral end of the winding 34 is connected by a line 35 to the return electrode 31 which dips into the bath. A wet-back electrode 36 of refractory metal, for example molybdenum is, as shown more clearly in FIGS. 1 and 2, mounted on the end wall 4 of the tank structure beneath the spout. The electrode 36 is in the form of a long bar of L-shaped cross-section and is disposed so that it dips into the pool 26 of molten glass near to the end wall 4. An electrical connector 37 extends outwardly beneath the spout and is connected by a line 38. FIG. 3, to a variable tapping 39 on an autotransformer winding 40 which is connected across the mains the neutral end of which is connected by a line 41 to the return electrode 31. The electrode 36 is sealed into the space between the tank end wall 4 and the undersurface of the spout 12.

Figure 4:
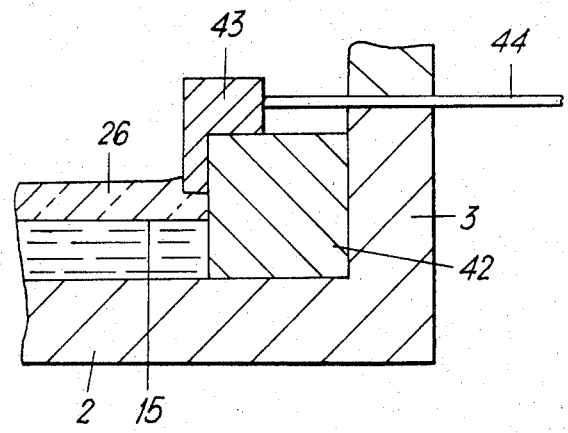
FIG. 4 is a section on line IV—IV of FIG. 3.

Restrictor tiles 42 are fixed in the tank structure at either side of the spout and the margins of the pool 26 wet on to these tiles. On each of the tiles 42 there is mounted an L-shaped molybdenum electrode 43 which dips downwardly into the molten glass, being spaced from the molten metal surface 15, as shown in FIG. 4.

A steel electrical connection rod 44 extends from each electrode 43 through the tank side wall. One rod 44 is connected by a line 45 to a variable tapping 46 on an autotransformer winding 47 which is connected across the mains. The neutral end of the winding 47 is connected by a line 48 to the return electrode 41. The other rod 44 is similarly connected by a line 49 to a variable tapping 50 on an autotransformer winding 51 which is connected across the mains and the neutral end of which is connected by a line 52 to the return electrode 31.

Adjustment of the position of the tapping 33 on the autotransformer 34 provides independent adjustment of the voltage on line 32 and on the electrode bar 27. This provides for regulation of the heating current which passes through the molten glass flowing through the aperture 28 to regulate the viscosity of the glass and so ensure that the glass is at a viscosity in which the required wetting of the glass on to the member 27 is assured while only the required amount of viscous drag on the forwardly flowing glass is provided. There is ready release of the glass from the refractory member 27 owing to the maintenance of a suitable low viscosity of the glass.

The temperature of the bath at the inlet end and of the molten glass 21 being poured on to the bath is generally of the order of 1,000°C to 1,050°C and the pool 26 of molten glass is at this temperature. Regulation of the autotransformer 40 to regulate the power supplied on line 38 to the wet-back electrode provides thermal regulation of the pool 26 of molten glass beneath the spout, independently of the temperature of the glass flowing through the aperture 28 beneath the bar 27. The glass beneath the spout is thus maintained at a viscosity at which it clings to the electrode 36 which electrode 36 thus not only regulates the temperature of the glass 26, which is cooler than the glass flowing through the aperture 28 but also maintains the width of the wet-back region of the pool 26 and enhances outward flow of molten glass from the wet-back region into the margins of the pool which flow against the restrictor tiles 42.

The independently connected autotransformers 47 and 51 permit independent adjustment of the power dissipated in heating the molten glass in the margins of the pool 26 in the region of the electrodes 43. This assists in directing marginal flows 53 of molten glass from the pool 26 around the ends of the bar electrode 27 into the margins of the ribbon to form the thickened margins 54 which apply lateral constraint to narrowing of the drawn ribbon.

Traction is applied by the rollers 6 to draw the ribbon of glass 7 along the molten metal surface 15 from the glass which is flowing through the aperture 28.

In one example of operation of experimental plant for the production of a ribbon of glass 5 mm thick at a speed of 110 meters per hour, molten glass is fed to the bath at a load of 70 tonnes per week. The bar electrode 27 is 350 mm wide, that is transversely of the bath, and 25 mm long in the direction of glass flow, and is positioned 9 mm above the lower level 15 of the bath surface supporting the pool 15. The width of the usable central part of the ribbon 5 mm thick was 300 mm. To achieve this result the supply on line 32 to the electrode 27 was 22 volts, 450 amps, 10 KW, and on line 38 to the wet-back electrode was 30 volts, 200 amps, 6 KW. The supply to the electrodes 43 was balanced at about 27 volts, 48 amps, 1.5 KW.

The current flowing across the aperture 28 through the molten glass beneath the bar 27 raises the temperature of the glass as it flows through the aperture to about 1,250°C to 1,300°C so that the viscosity of the glass in this region is about $10^3$ poises. As will be apparent, the glass in this region is thus at a lower viscosity than glass of the pool 26 upstream of the bar 27 inasmuch as that upstream glass is, as earlier noted, at a lower temperature of the order of 1,000°C to 1,050°C.

The traction which is transmitted upstream by the formed ribbon of glass 7 which is being cooled as it is advanced along the bath draws the ribbon 7 from the very low viscosity glass flowing through the aperture 28. The maintenance of the width of the ribbon is assisted by the marginal flows 53 of cooler molten glass to form the thicker edges 54 of the ribbon, which edges provide lateral constraint against narrowing of the ribbon.

The lower surface of the ribbon is formed in contact with the molten metal surface as the molten glass is drawn away from the aperture against the viscous drag effective as reaction to the traction forces in combination with the forces acting to restrain forward flow, notably the upthrust of the molten tin acting on the glass where the surface level of the bath changes, and surface tension forces due to the wetting of the upper surface of the molten glass on to the bar 27.

These surface tension forces play a major role in the formation of the upper surface of the ribbon which is formed at the meniscus 56, FIG. 1, where the molten glass wets on to the downstream face of the bar 27.

The viscosity of the cooler glass in the marginal flows 53 is about $10^{4.5}$ poises and the effect is to produce the thickened margins 54 which are more viscous than the central region 55 of the ribbon which has been drawn to 5 mm thickness.

It has been found that the speed of discharge of the ribbon 7 from the bath and the maintenance of ribbon width are dominant in determining the thickness of the central part 55 of the ribbon. The height of the bar 27 above the bath surface, and hence the height and configuration of the aperture 28, is also an important setting. Other factors which play a part in the setting of the apparatus for producing a particular glass thickness are the electric power dissipated in heating the glass, the height of the head of molten glass constituted by the pool 26 which is held back by the electrode bar 27, and the length of the bar 27 in the direction of glass flow.

Immediately after the ribbon of glass has been formed it may be subjected to a relatively rapid cooling regime, for example by means of a cooling box indicated at 57 in FIG. 1, in order to assist the stiffening and setting up of the ribbon at a desired thickness.

Variation in the speed of the traction rolls 6 results in variation of the thickness of the usable central part 55 of the ribbon, and glass from 10 mm thick down to 3 mm thick has been produced by this method.

The fact that the ribbon is formed from glass which has been maintained at high temperature on the surface of the molten metal bath ensures that the glass produced has surfaces of fire-finished quality and is substantially free from distortion.

The thickened margins are trimmed off the ribbon when the glass has been annealed.

Figure 7:
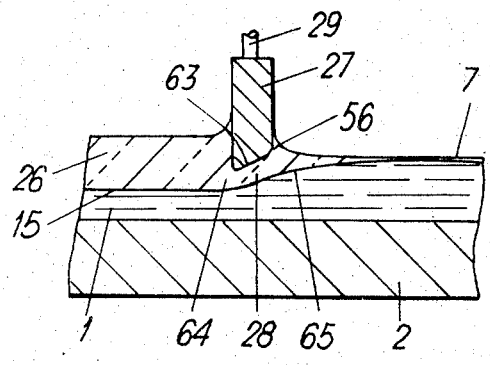
FIG. 7 is a section on line VII—VII of FIG. 6.
Figure 5:
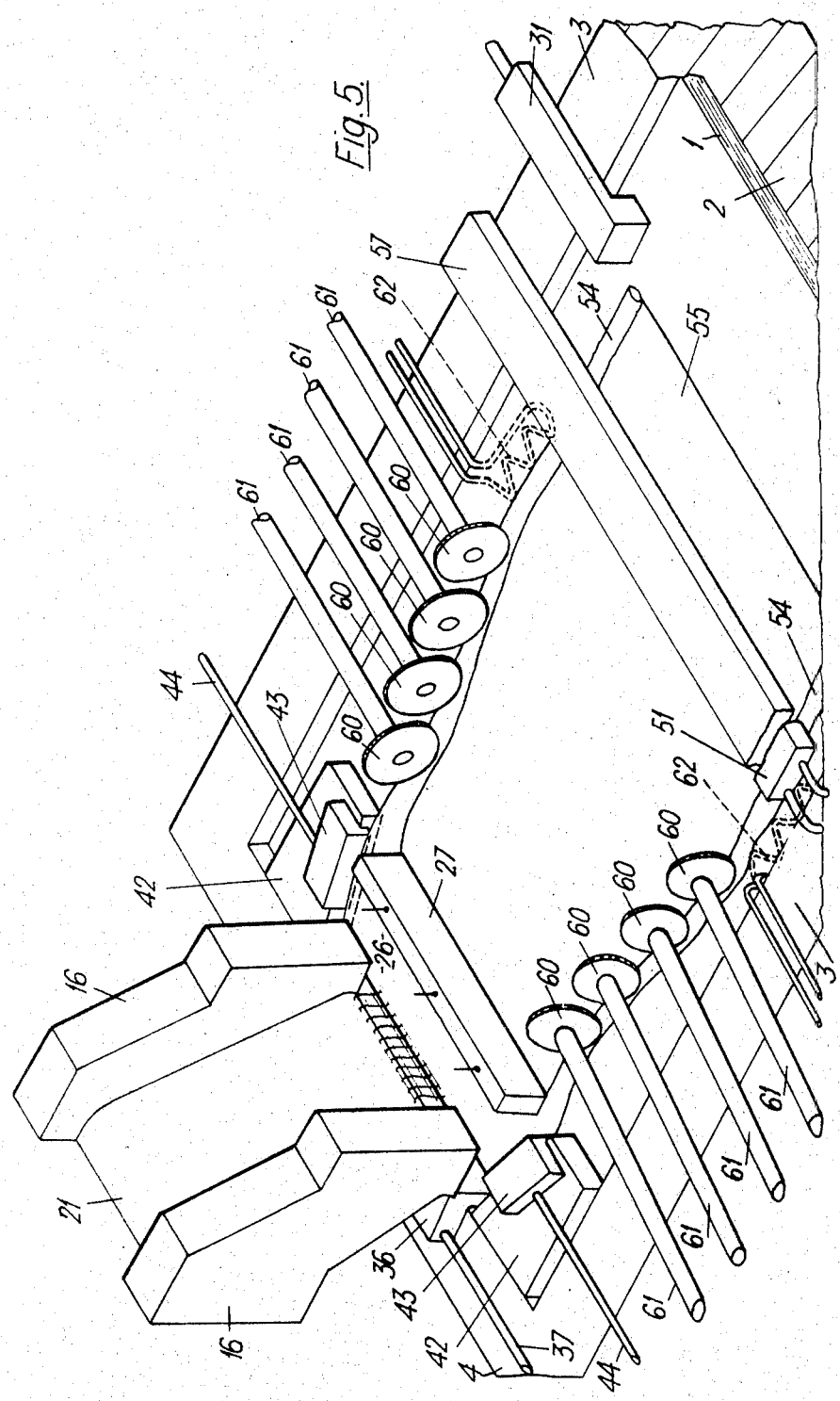
FIG. 5 illustrates a modification of the apparatus of FIG. 1 with lateral constraint applied to the margins of the ribbon of glass.
Figure 6:
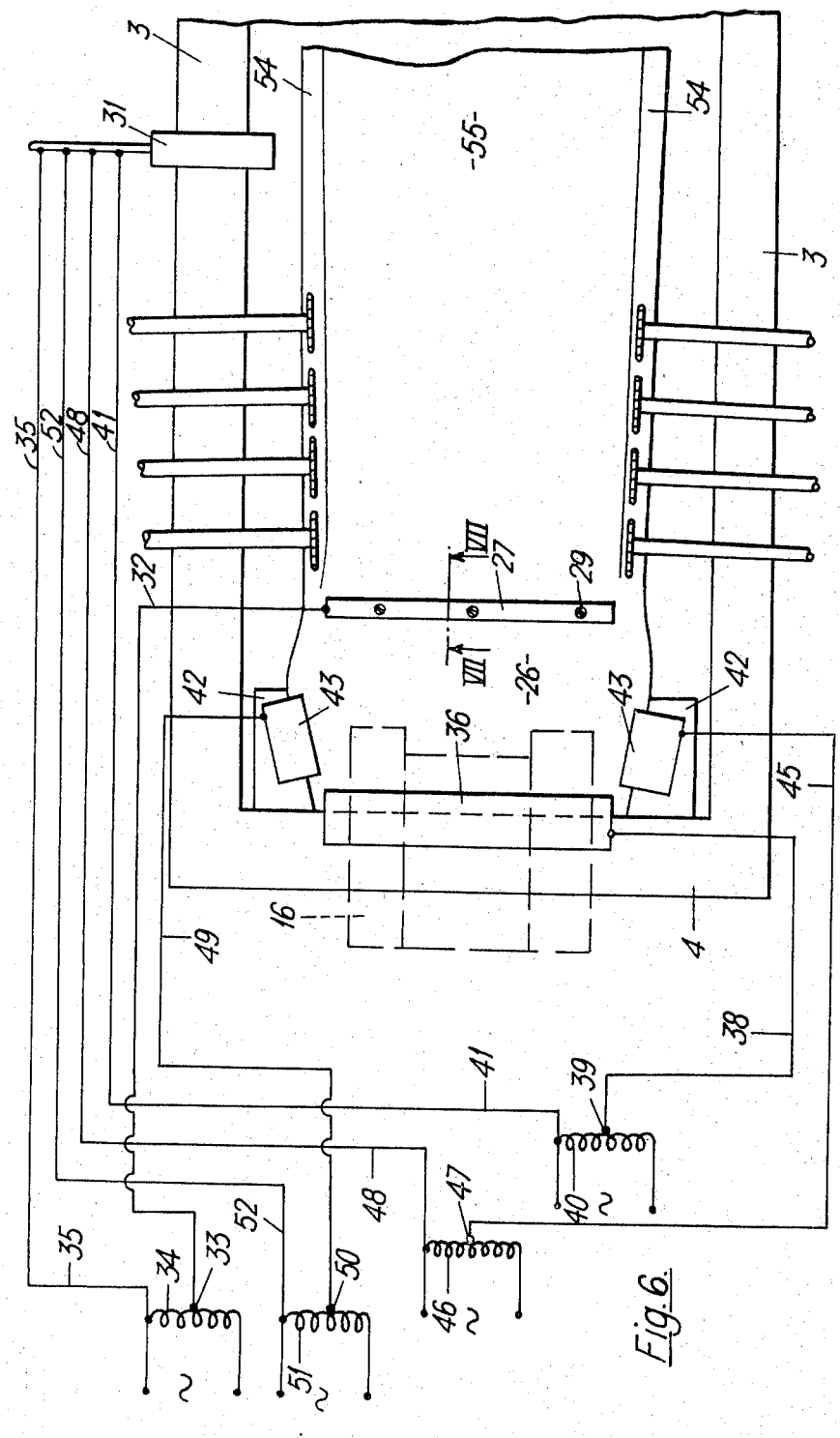
FIG. 6 is a plan view of the apparatus of FIG. 5 showing the connection of electrical supplies to the apparatus.

FIGS. 5 to 7 illustrate a modification of the apparatus of FIGS. 1 to 4, for the production of thinner flat glass, for example flat glass 1 mm or 2 mm thick, and glass foil down to 0.05 mm thick.

The restrictor tiles 42 do not extend right up to the tank side walls 3, and the thickened margins 54 of the ribbon of glass are engaged by a series to top rolls 60 mounted on shafts 61 which extend through the side walls of the tank structure. The top rolls 60 are graphite or heat resistant stainless steel discs with toothed edges which bite into the thickened margins 54 of the glass. The shafts 61 are at an angle of 80° to the direction of advance of the ribbon, and the top rolls are slightly staggered towards the tank side walls, when considered in the direction of advance of the glass so that the width controlling forces applied to the thickened margins 54 of the glass do apply slight lateral stretching forces to the central part 55 of the ribbon thereby augmenting the purely laterally constraining function of the rolls.

The edge rolls also impart stability to the marginal flows 53 of molten glass around the ends of the electrode bar 27, and counteract tendencies of the thin central part 55 of the ribbon to become deformed.

Just downstream of the two series of top rolls, coolers 62 are immersed in the molten metal bath. Each of the coolers is a steel pipe bent into zig-zag form and is connected to a cooling water supply. These coolers are effective to extract heat from the thickened margins 54 of the ribbon to help maintain ribbon width immediately after the glass passes downstream of the top rolls 60. The cooling box 57 extends right across the tank structure just downstream of the position of the coolers 62 and presents an extensive lower, heat-absorbant surface to the glass.

Throughout the passage of the glass between the top rolls 60 it has been cooling, and the effect of the coolers 57,62 is to ensure that the central part 55 of the ribbon is set up while laterally constrained by the top rolls and is stiff enough to prevent the thickened margins, which retain more heat than the centre of the ribbon, from necking in to reduce ribbon width and deform the already stiffened central ribbon part of thin glass.

The configuration of the aperture 28 defined beneath the bar 27 is illustrated in FIG. 7. The undersurface 63 of the bar slopes upwardly in the direction of glass flow to provide an aperture 28 whose maximum construction is at the upstream entrance to the aperture. Thereafter the aperture gradually increases in height, the slope of the undersurface 63 of the bar 27 being related to the uprise 65 in the molten metal surface beneath the bar, which finds its own form when stable conditions of operation have been set up.

In one example of operation of the apparatus of FIGS. 5 to 7, for the production of glass foil 0.1 mm thick, four pairs of top rolls 60 are employed as shown in FIGS. 5 and 6, each mounted on a shaft at an angle of 80° to the direction of ribbon advance.

The bar 27 is 460 mm wide, transversely of the bath, and 50 mm long in the direction of glass advance. The top rolls 60 are all driven at a rate equivalent to a peripheral speed of 820 metres per hour, and the ribbon of glass 7 was withdrawn from the bath at 820 metres per hour.

The electrical power supply settings were as in the following table.

TABLE I

| Electrode | Volts | Amps | Power kW |
| --- | --- | --- | --- |
| Electrode bar 27 | 25 | 480 | 12 |
| Wet-back electrode 36 | 30 | 120 | 3.6 |
| Right-hand electrode 43 | 25 | 40 | 1 |
| Left-hand electrode 43 | 36 | 56 | 2 |

These settings produced, at a rate of 18 tonnes per week, a ribbon of glass foil 520 mm wide and 0.1 mm thick.

Figure 8:
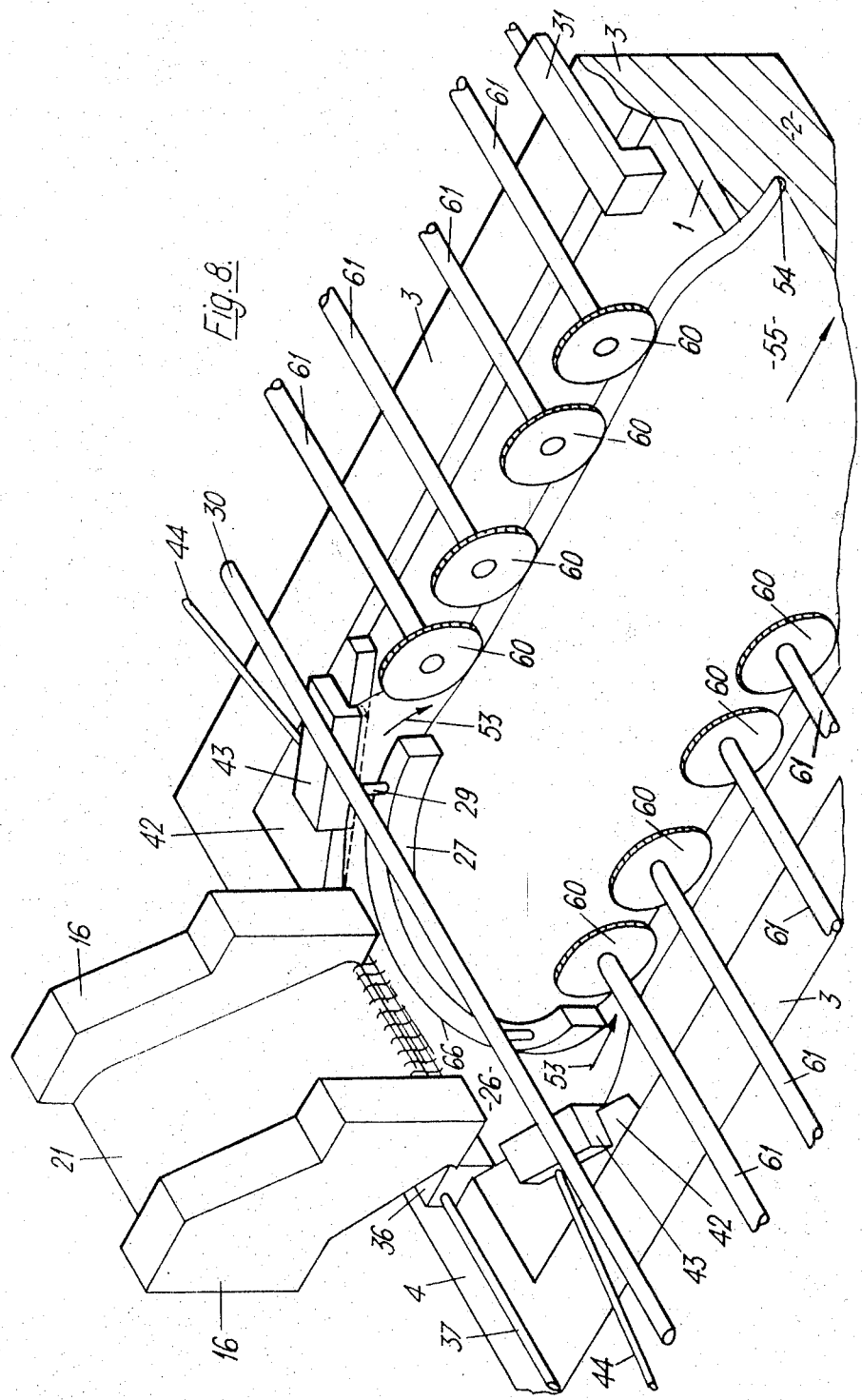
FIG. 8 is a perspective view similar to FIG. 5 of another embodiment which employs a curved electrode bar.
Figure 9:
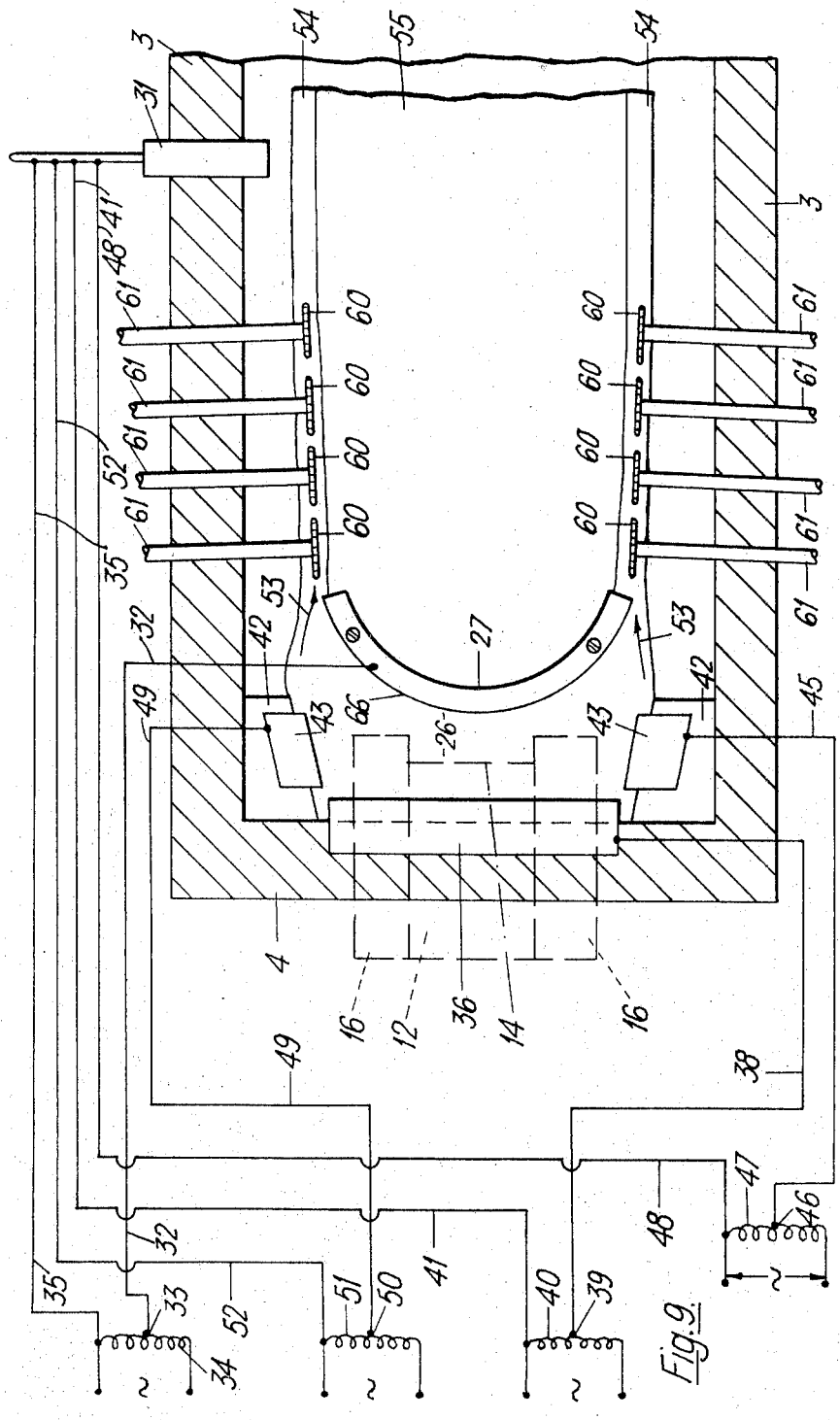
FIG. 9 is a plan view of the apparatus of FIG. 8 showing the connection of electrical supplies to the apparatus.

FIGS. 8 and 9 illustrate an embodiment of the invention for the manufacture of flat glass of thickness 1mm. to 0.05mm. The bar 27 of refractory metal, preferably molybdenum, is of curved form and is fixed above the bath surface, from the electrically conductive crossbeam 30, with its convex surface 66 facing upstream towards the spout lip 14. The height of the lower surface of the bar 27 above the bath surface is of the same order as in the embodiment of FIGS. 1 to 4, namely 7 mm. to 18 mm.

The convex form gives an operational benefit in avoiding stagnant regions of molten glass in the pool 26 behind the electrode and in assisting the marginal flows of molten glass 53 into the thickened margins of the ribbon. Further the curved form of the bar 27 assists setting up of the thin glass being drawn from the glass flowing beneath the central part of the aperture before the associated edges of the ribbon are set up.

A cooling box may be provided over the glass to cool the glass rapidly as it emerges from the area within the arc of the bar 27. Definite lateral constraint acting against tendency of the ribbon to narrow is provided by top rolls 60 mounted in pairs on shafts 61 extending through the side walls of the tank structure. The shafts 61 are mounted in the side walls at right angles to the downstream direction of ribbon advance and apply laterally constraining forces to the thickened margins of the ribbon which act to control and maintain the width of the ribbon of glass which is being subjected to high tractive forces from the rollers 6.

The setting up of the central region 55 of the ribbon was assisted by ensuring that all the top rolls 60 were driven at the same speed so that there was no appreciable acceleration of the glass during its passage between the top rolls 60 and the formation of the ribbon of glass was completed without any substantial tendency for distortion to be introduced into the central thin part 55 of the ribbon.

Flat glass 1 mm. thick was produced using a curved stainless steel electrode 27 and top rolls 60 as illustrated in FIGS. 8 and 9. The curved electrode was 540 mm. wide, and 25 mm. long in the direction of glass flow.

The top rolls 60 were all driven at a peripheral speed of 220 meters per hour and the ribbon of glass 7 was discharged from the bath at 190 meters per hour.

The electrical power supply settings were as in Table II.

TABLE II

| Electrode | Volts | Amps | Power k.w. |
| --- | --- | --- | --- |
| Electrode bar 27 | 22 | 420 | 9.25 |
| Wet-back electrode 36 | 30 | 180 | 5.4 |
| Right hand electrode 43 | 22 | 40 | 0.9 |
| Left hand electrode 43 | 24 | 45 | 1.2 |

These settings produced at a rate of 40 tonnes per week, a ribbon of flat glass 500 mm. wide and 1 mm. thick.

Figure 10:
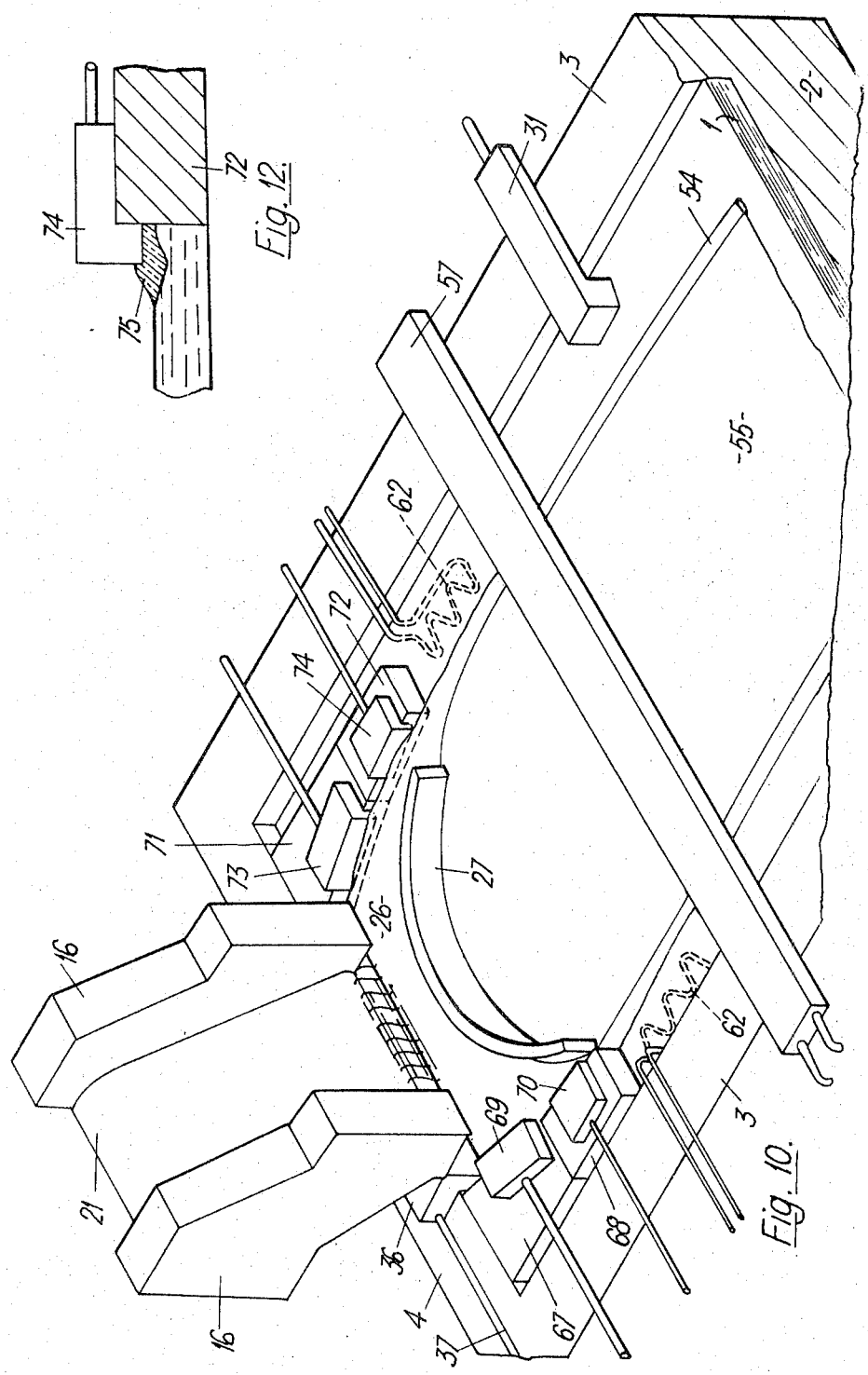
FIG. 10 is a perspective view similar to FIG. 8 illustrating the production of glass foil.
Figure 11:
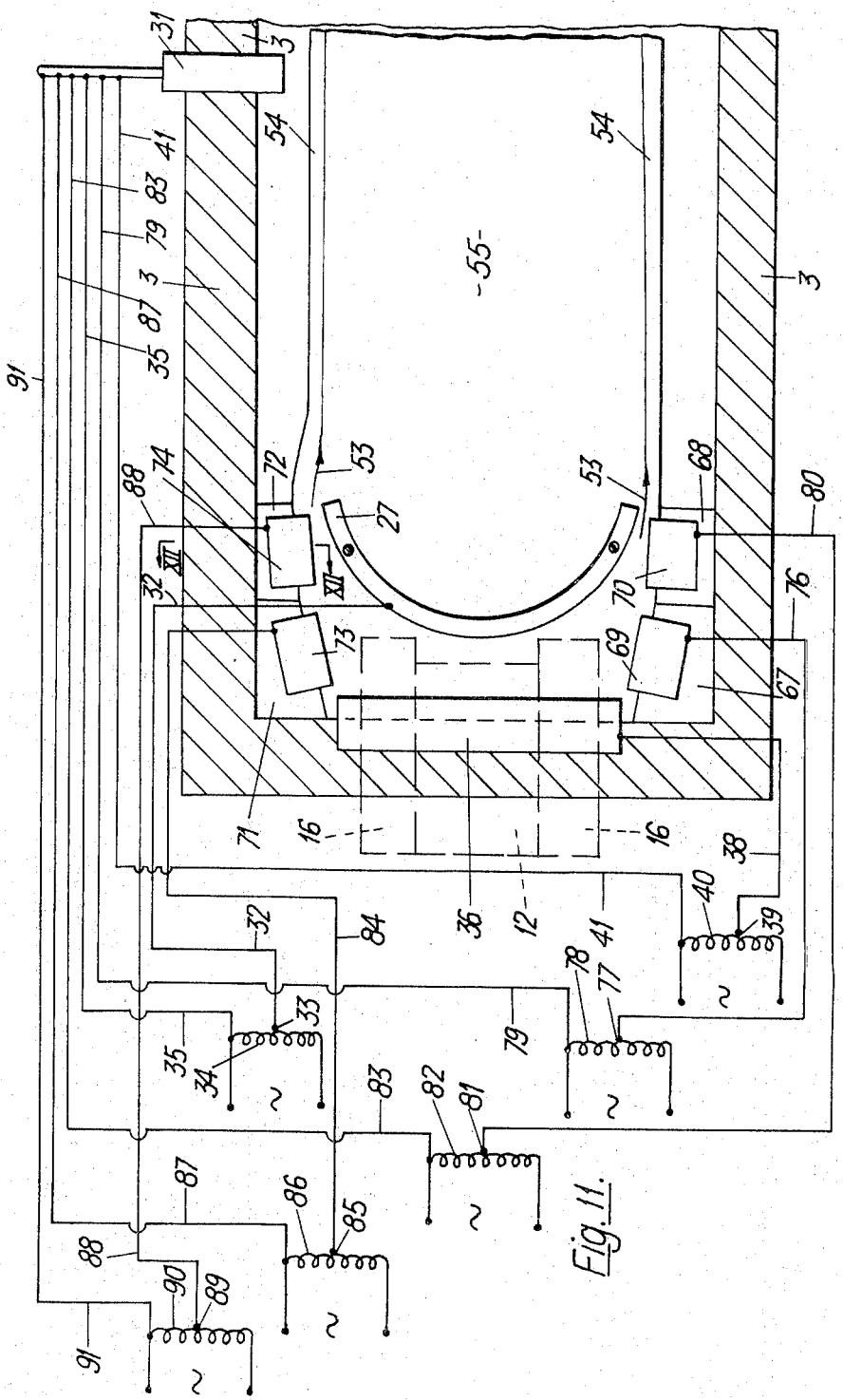
FIG. 11 is a plan view of the apparatus of FIG. 10 showing the connection of electrical supplies to the apparatus.

FIGS. 10 to 12 illustrate a method and apparatus according to the invention for the manufacture of glass foil of thickness in the range 0.1 mm to 0.005 mm. This arrangement is particularly effective for the manufacture of very thin glass foil, for example of thickness 0.02 mm or 0.01 mm or 0.005 mm. A curved electrode bar 27 is used similar to the bar employed in the embodiments of FIGS. 8 and 9 but there are no top rolls. More complex marginal heating arrangements are employed upstream of the curved electrode bar 27 to produce marginal flows 53 which set up thickened margins 54 of the ribbon which apply the necessary lateral constraint for maintaining the width of the ribbon whose central part 55 is the required glass foil.

At the right-hand side of the inlet end of the tank structure there are two restrictor tiles 67 and 68. A molybdenum heating electrode 69 is mounted on the tile 67 and a similar electrode 70 is mounted on the tile 68.

On the left-hand side of the tank structure there is a matching arrangement of restrictor tiles 71 and 72 and molybdenum heating electrodes 73 and 74. FIG. 12 is a section through the tile 72 and electrode 74 showing the disposition of the electrode relative to the margin 75 of the glass which is flowing around the end of the curved bar 27.

Each of the electrodes 69, 70, 73 and 74 has its own individual power supply. The electrode 69 is connected by a line 76 to a tapping 77 on an autotransformer winding 78 which is connected across the mains. The neutral side of the winding 78 is connected by a line 79 to the return electrode 31.

The electrode 70 is similarly connected by a line 80 to a tapping 81 on an autotransformer winding 82 which is connected across the mains and whose neutral side is connected by a line 83 to the return electrode 31.

In the same way the heating electrode 73 is connected by a line 84 to the variable tapping 85 on an autotransformer winding 86 which is also connected across the mains and whose neutral side is connected by a line 87 to the return electrode 31. Also the heating electrode 74 is connected by a line 88 to the variable tapping 89 on an autotransformer 90 which is connected across the mains and whose neutral side is connected by a line 91 to the return electrode 31. This arrangement permits the individual adjustment of the heating of the marginal flows from the pool 26 around the ends of the electrode bar 27 so as to ensure that the molten glass takes the form illustrated in FIG. 12 whereby thicker margins 75 are formed which are wetted on to the electrodes 74 and thereby apply lateral constraint to the glass foil already formed within the curve of the electrode 27, by the time that foil is moving out of the area bounded by the ends of the electrode 27.

Coolers 62 are immersed in the molten metal of the bath near to the ends of the electrode 27 so as to cool the thickened margins rapidly and thereby further assist the maintenance of the ribbon width. The overhed cooler 57 is also employed as illustrated in FIG. 10 to stabilise the dimensions of the foil.

In one example of operation of the apparatus of FIGS. 10 to 12 for the manufacture of glass foil 0.1 mm thick the electrode bar 27 is 520 mm wide, considered transversely of the bath, and is 25 mm long in the direction of glass flow. The ribbon of glass foil with thick margins is discharged from the bath at 1,400 m/hr. The thickness of the foil is 0.1 mm and the width of the centre part 55 of the ribbon is 516 mm. This gives an effective output of 0.1 mm glass foil of 25 tonnes per week. To achieve this result the setting of the electrical power supplies is in Table III.

TABLE III

| Electrode | Volts | Amps | Power kW |
|---|---|---|---|
| Electrode Bar 27 | 23.5 | 405 | 9.5 |
| Wet-back Electrode 36 | 30 | 230 | 7.0 |
| Heating Electrode 73 | 32 | 80 | 2.6 |
| Heating Electrode 74 | 37 | 40 | 1.5 |
| Heating Electrode 69 | 32 | 80 | 2.6 |
| Heating Electrode 70 | 35 | 60 | 2.1 |

Figure 14:
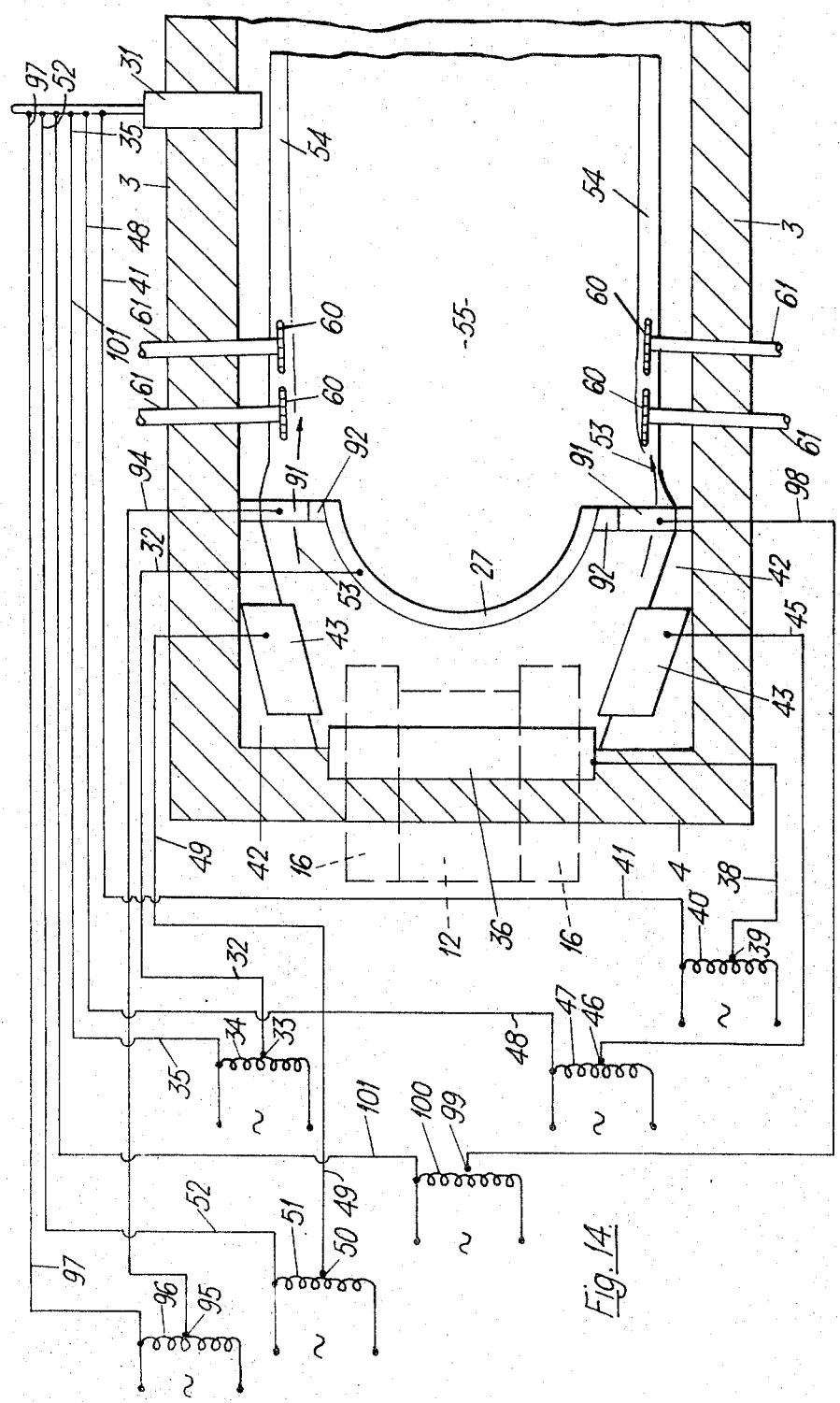
FIG. 14 is a plan view of the apparatus of FIG. 13 showing the connection of electrical supplies to the apparatus.

FIGS. 13 and 14 illustrate another way of making glass foil employing a curved electrode bar 27. Upstream of the electrode bar 27 there are single heating electrodes 43 which are somewhat longer than in earlier embodiments. Downstream of the ends of the curved bar 27 there are two pairs of top rolls 60 of the same kind as employed in FIGS. 5 and 6 and with their shafts 61 at right angles to the direction of advance of the ribbon of glass foil.

Side extensions 91 of the curved electrode bar 27 are provided and each of these can be considered as a wing elecrtrode extending from one end of the bar 27 to the adjacent tank side wall 3. Each of the electrodes 91 is insulated from the bar 27 by an insulating piece 92, e.g. of sillimanite. The wing electrodes 91 are shallower than the electrode bar 27 so that the underfaces of the wing electrodes 91 are further above the bath surface than the underface of the curved electrode bar 27 to provide passages 93 for the marginal flows 53 of molten glass from the pool 26 into the thickened margins 24 of the ribbon. The marginal flows 53 beneath the electrodes 91 wet onto those electrodes and on to the electrically insulating pieces 92.

The temperature of the marginal flows can be individually regulated at this point by the passage of current through the marginal flows 53 into the bath and to effect this the left-hand wing piece 91 is connected by a line 94 to a variable tapping 95 on the winding 96 of an autotransformer which is connected across the mains supply and the neutral side of which is connected by a line 97 to the return electrode 31.

Similarly the right-hand wing electrode 91 is connected by a line 98 to a varaible tapping 99 on an autotransformer winding 10 which is connected across the mains supply and whose neutral side is connected by a line 101 to the return electrode 31.

The heating of the molten glass flows 53 beneath the wing electrodes 91 intensifies the wetting of the glass flows 53 on to the wing electrodes thereby assisting the maintenance of the width of the ribbon of glass foil which has already been set up within the curve of the electrode bar 27.

The top rolls 60 then take over to maintain that width as the glass foil is rapidly cooled and stabilised by means of extensive cooling pipes 102 which are immersed in the bath and extend beneath the whole area of the glass foil between the top rolls 60. These extensive coolers 102 act in combination with the overhead cooling box 57 which is mounted just downstream of the coolers 102, to cool rapidly the set-up ribbon of glass foil with thickened edges, whose advance is then continued along the bath.

In one example of operation of the embodiment of FIGS. 13 and 14, glass foil 0.01 mm thick and 500 mm wide is discharged from the bath at a speed of 5,000 m/hr. The top rolls 60 are driven at the same peripheral speed of 5,000 m/hr.

The electrode 27 is a curved bar 500 mm wide transversely of the bath and 25 mm long in the direction of glass flow. The undersurface of the bar 27 slopes upwardly in the manner illustrated in FIG. 7.

The electrical power supplies are as set out in Table IV.

TABLE IV

| Electrode | Volts | Amps | Power kW |
|---|---|---|---|
| Electrode Bar 27 | 22 | 450 | 10 |
| Wet-back Electrode 36 | 40 | 250 | 10 |
| Heating Electrodes 43 | 45 | 90 | 4 |
| Wing Electrodes 91 | 30 | 60 | 1.8 |

With this setting of the plant the glass foil 0.1 mm thick and 500 mm wide is produced at a rate of 25 tonnes per week.

Figure 15:
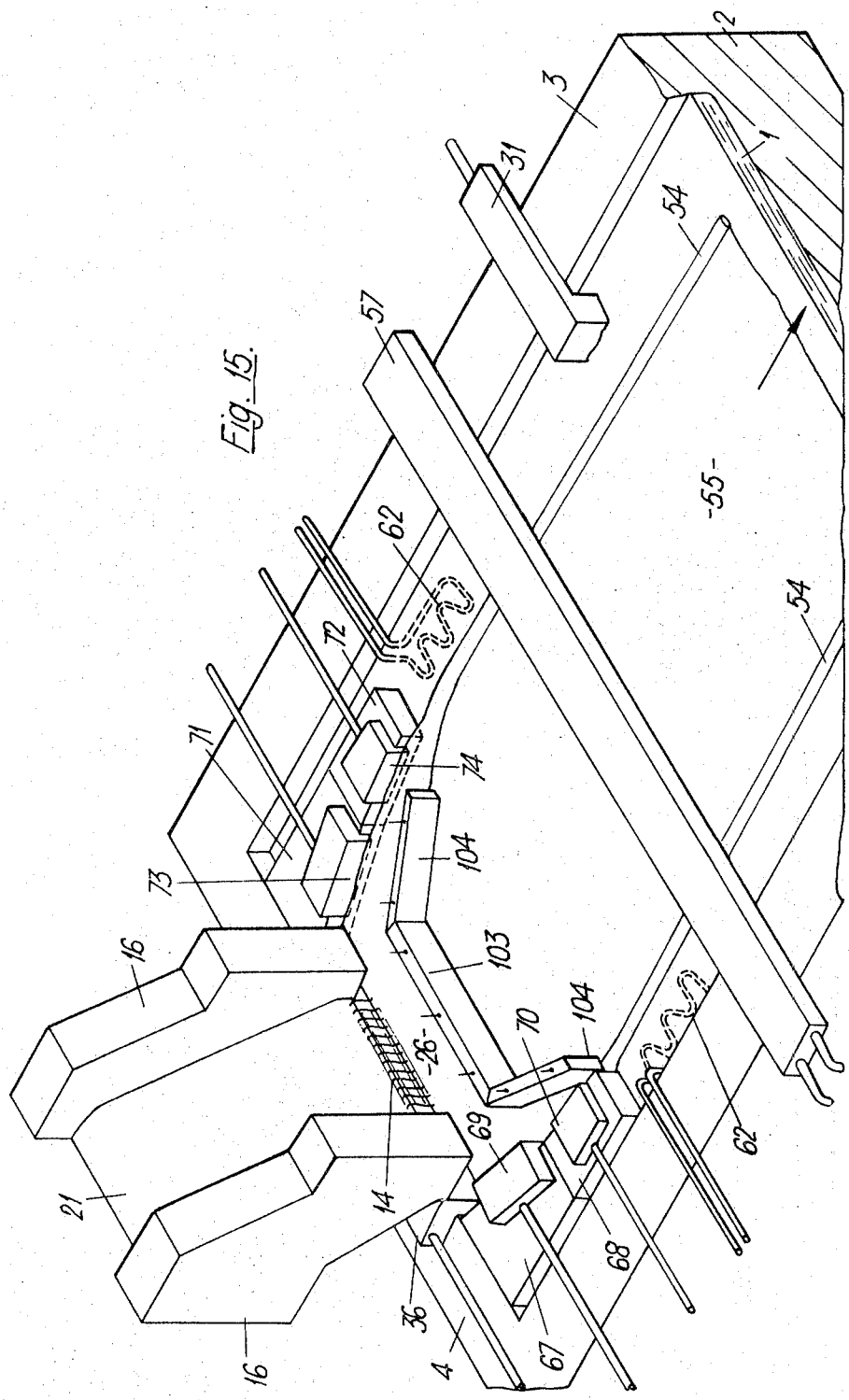
FIG. 15 is a perspective view of the apparatus of FIG. 10 with a modified shape of electrode bar.

FIG. 15 illustrates another way of manufacturing glass foil, for example foil from 0.1 mm down to 0.005 mm thick. The apparatus is similar to that of FIGS. 10 and 11, but instead of the curved electrode bar illustrated in those figures the electrode has a straight central part 103 parallel to and spaced from the spout lip 14, and wing pieces 104 fixed to the ends of the central part and angled at 25° to the direction of flow of the glass. The whole bar is a unitary structure of heat resistant stainless steel and is suspended by means of struts indicated at 29. The whole of the bar 103, 104 is connected to the supply of heating current.

In the region of marginal flows from the pool 26 there are pairs of marginal heaters 69, 70 and 73, 74 which are connected and function in the same way as described with reference to FIGS. 10 and 11.

In the operation of this embodiment of FIG. 15 for the production of glass foil 0.1 mm thick and 480 mm wide the speed of discharge of the ribbon from the bath was 1,300 m/hr. and the glass foil, when trimmed, was produced at a rate of 26 tonnes per week.

The setting of the electrical supplies to the apparatus was as in Table V.

TABLE V

| Electrode | Volts | Amps | Power KW |
|---|---|---|---|
| Electrode 103, 104 | 21 | 360 | 7.6 |
| Wet-back Electrode 36 | 45 | 200 | 9.0 |
| Heating Electrode 73 | 41 | 125 | 5.1 |
| Heating Electrode 74 | 27 | 90 | 2.4 |
| Heating Electrode 69 | 49 | 110 | 5.4 |
| Heating Electrode 70 | 27 | 80 | 2.2 |

Figure 16:
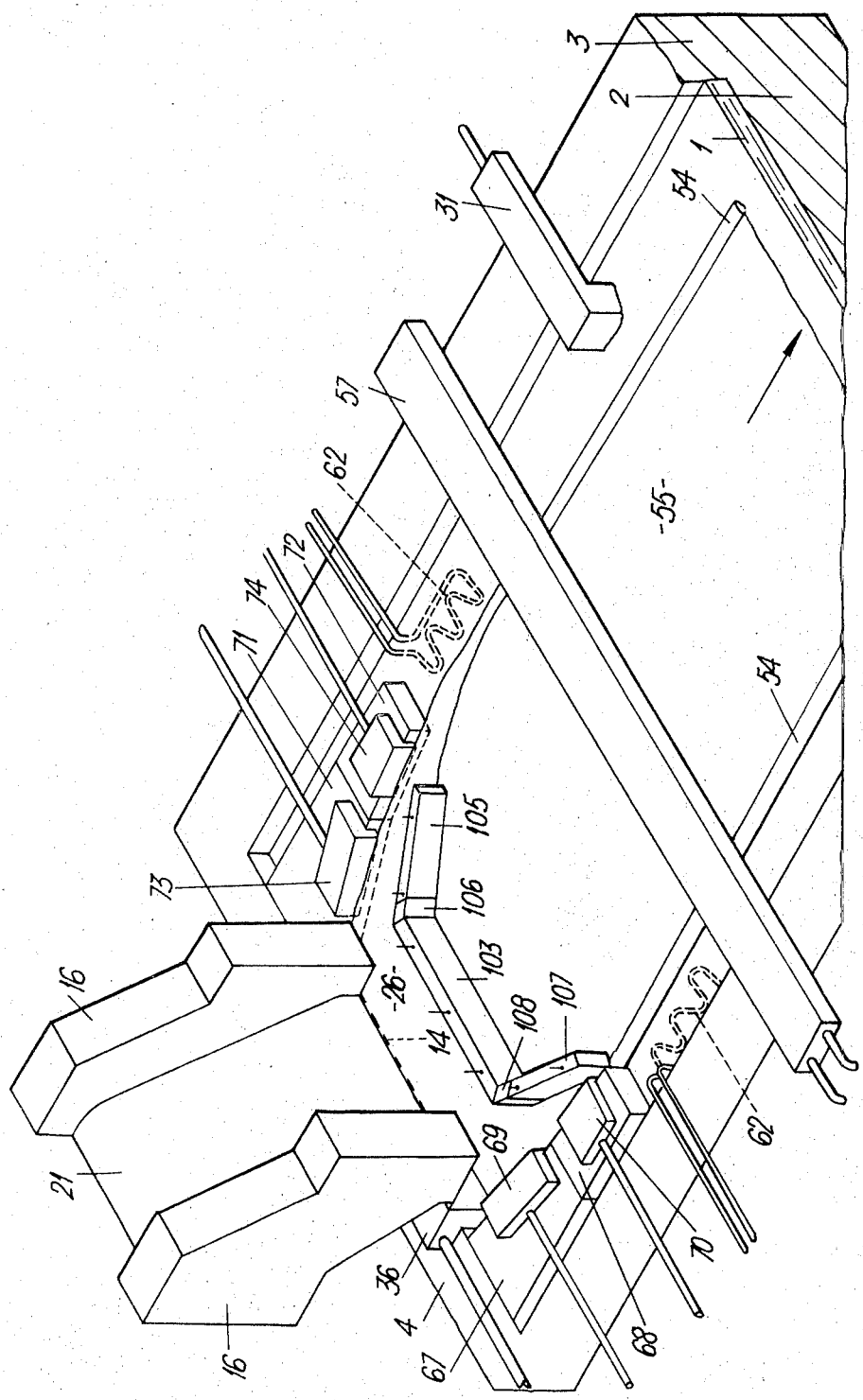
FIG. 16 is a perspective view of a modified form of the apparatus of FIG. 15 with a three-part electrode bar holding back the molten glass on the bath
Figure 17:
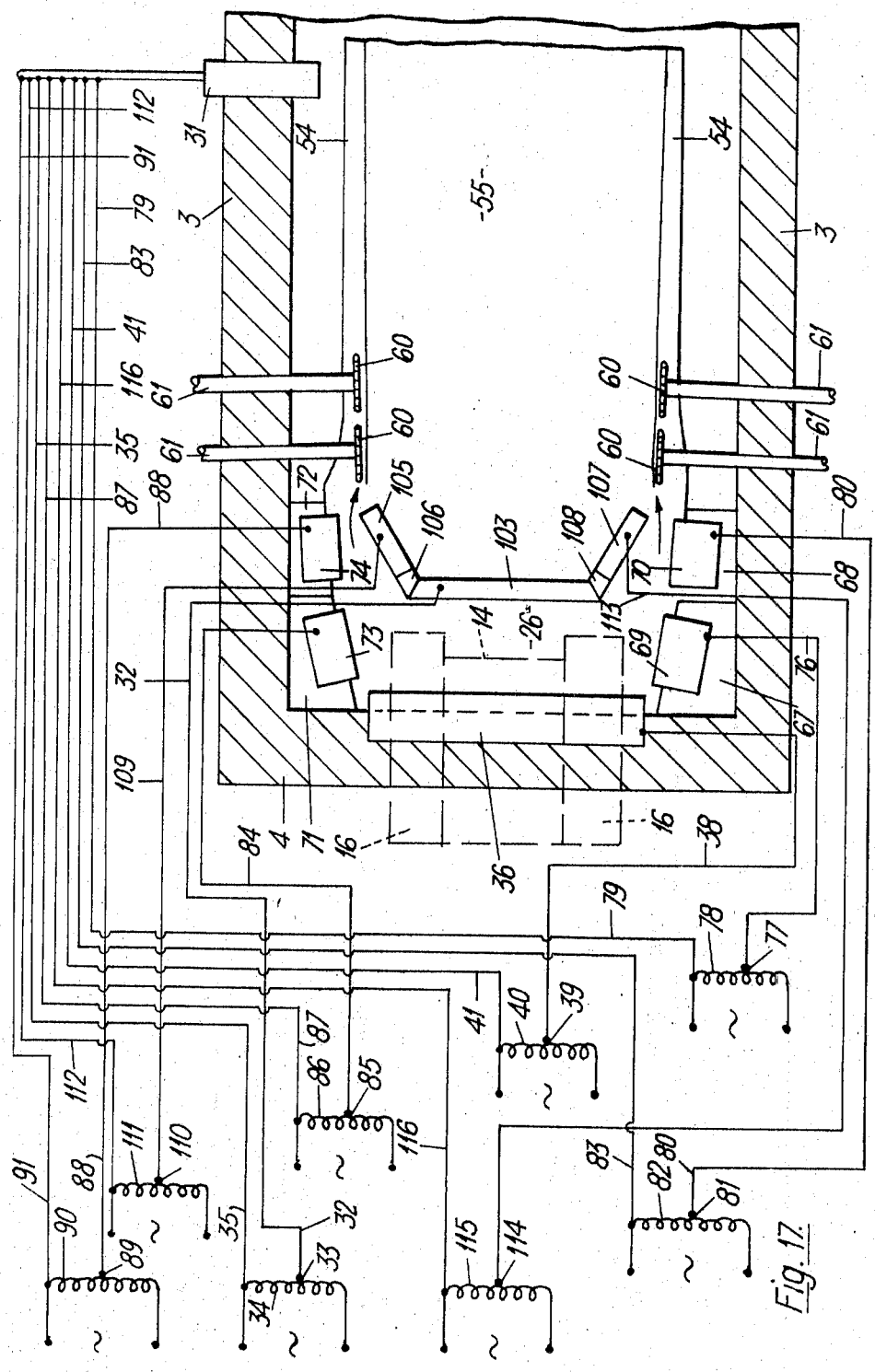
FIG. 17 is a plan view of the apparatus of FIG. 16 showing the electrical supply connections.

In the embodiment of FIGS. 16 and 17 which is also for the production of glass foil of thickness for example from 0.1 mm down to 0.005 mm, the electrode bar has the same general shape as that just described with reference to FIG. 15 but the wing pieces are formed as separate electrodes insulated from the central part of the electrode bar 103. At the left-hand side the angled wing piece 105 is insulated from the central part 104 by a block 106 of electrically insulating refractory material, for example sillimanite. Similarly the wing piece 107 at the right-hand side of the electrode bar is insulated from the central part 103 of the electrode bar by an electrically insulating block.

Separate electrical connections are provided from the power supply to the central part 103 and each of the wing pieces 105, 107. The central part 103 is supplied from the autotransformer 34. The wing piece 105 is connected by a line 109 to the variable tapping 110 on an autotransformer winding 111 which winding is connected across the mains and the neutral side of which is connected by a line 112 to the return electrode 31. The other right-hand wing piece 107 is connected by a line 113 to the variable tapping 114 on an autotransformer winding 115 which is connected across the mains and the neutral side of which is connected by a line 116 to the return electrode 31.

This arrangement provides for independent regulation of the temperature of the molten glass flowing beneath the central part of the electrode bar and the sides of the electrode bar which temperature regulation is in addition to the regulation of the temperature of the marginal flows 53 by means of the marginal heating electrodes 69, 70 and 73, 74 which are disposed at the sides of the pool 26 of molten glass held back by the composite electrode structure.

Immersed tin coolers are provided at the sides of the ribbon in a location just downstream of the ends of the wing pieces 105, 107. An overhead cooler 57 is also provided to assist stabilisation of the ribbon of glass foil and if desired top rolls 60 may be provided just downstream of the wing pieces 105, 107 as indicated in FIG. 17, which top rolls act by biting into the thickened margins of the ribbon and are driven at the same speed as the lehr.

In one example of operation for the production of glass foil 0.1 mm thick and 500 mm wide the electrode comprises a central bar 103 which is 350 mm wide and 25 mm long in the direction of glass flow. Each of the wing pieces 105 and 107 extends for 230 mm from the electrically insulating block by which it is connected to the central part of the electrode and is also 25 mm long the direction of glass flow. The ribbon of glass foil is discharged from the bath at 1,000 m/hr. and the rate of formation of the central part of the ribbon constituting the required glass foil is 22 tonnes per week.

The setting of the electrical supply system to the marginal heaters and to the parts 103, 105 and 107 of the electrode are as set out in Table VI.

TABLE VI

| Electrode | Volts | Amps | Power kW |
|---|---|---|---|
| Centre Electrode 103 | 20 | 250 | 5 |
| Wing Electrodes 105, 107 | 17 | 150 | 2.5 |
| Wet-Back Heater Electrode 36 | 30 | 200 | 5 |
| Heating Electrode 73 | 40 | 100 | 4 |
| Heating Electrode 74 | 40 | 125 | 5 |
| Heating Electrode 69 | 40 | 100 | 4 |
| Heating Electrode 70 | 40 | 125 | 5 |

Figure 18:
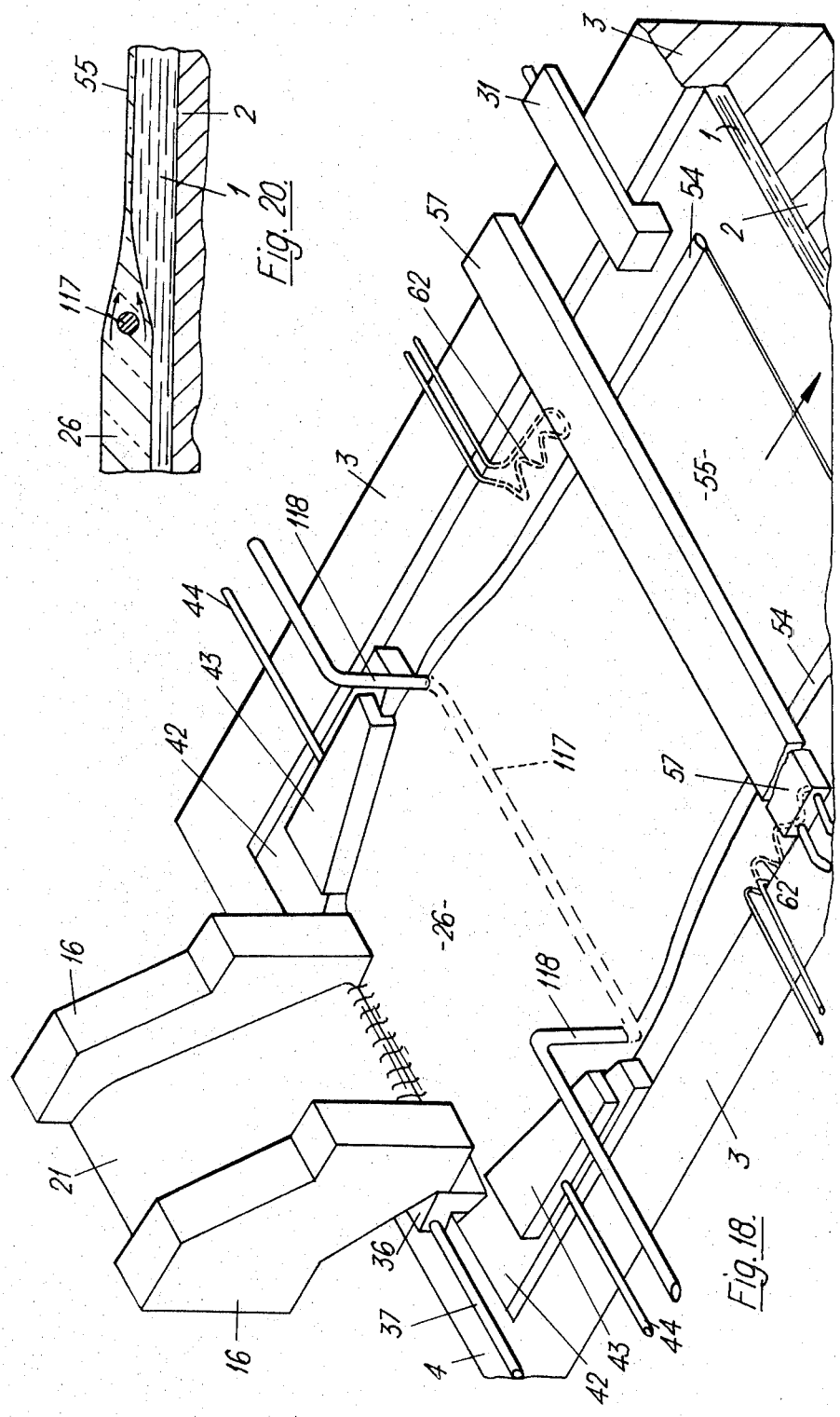
FIG. 18 is a perspective view of the inlet end of the tank structure in yet another embodiment of the invention in which a submerged electrode holds back the head of the molten glass.
Figure 19:
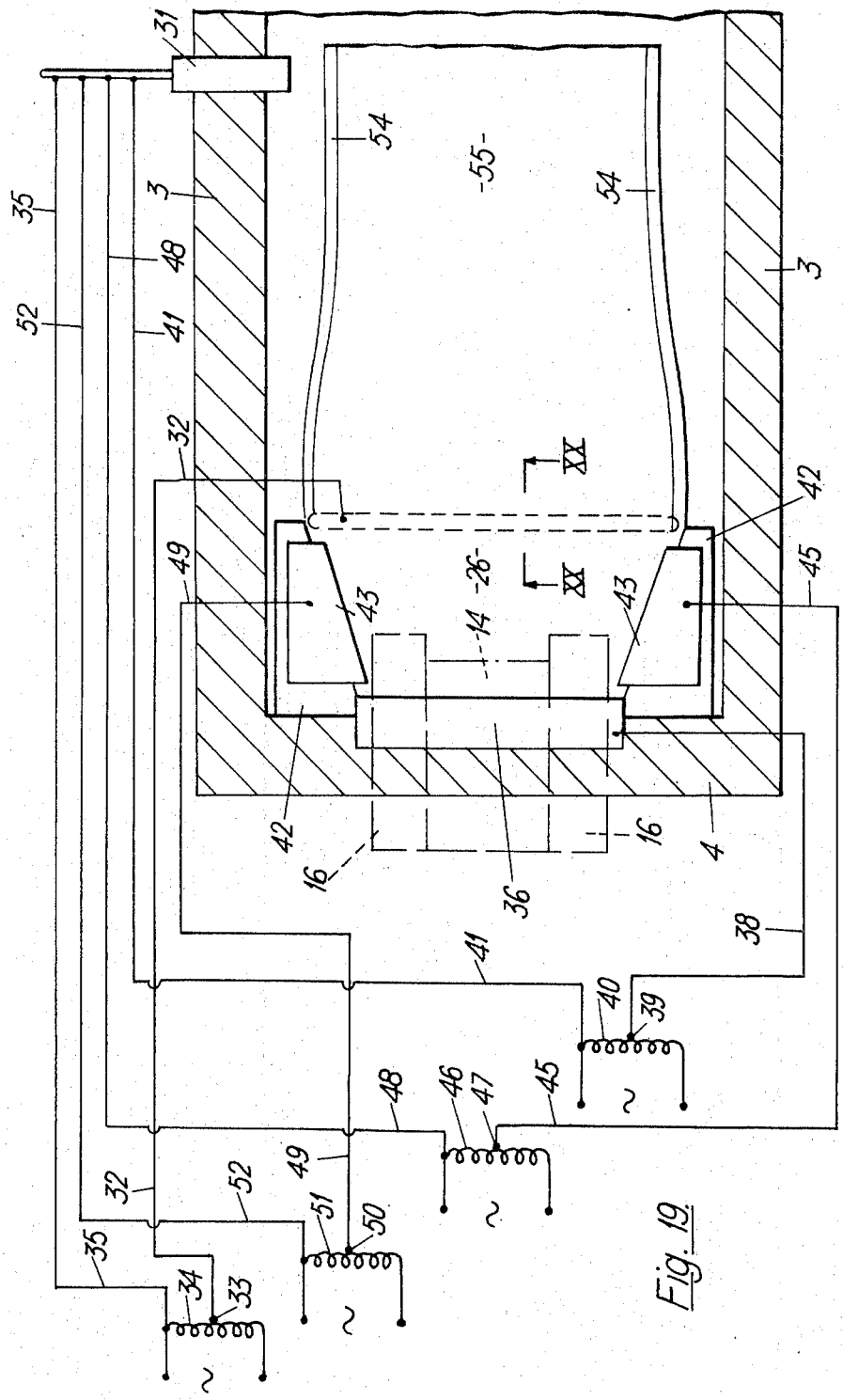
FIG. 19 is a plan view of the apparatus of FIG. 18 showing the electrical supply connections.

The embodiment of FIGS. 18 to 20 is for the production of thin glass and the forward flow of molten glass from the pool 26 is regulated by means of a linear solid member 117 which is totally immersed in the molten glass. The member 117 is a rod of heat-resistant stainless steel which is downwardly bent to a wide U form having a linear bottom portion which constitutes the immersed electrode 117. The upwardly bent sides 118 of the electrode project upwardly through the marginal flows of molten glass and are then bent to pass outwardly through the sides of the tank structure. The height of the linear part 117 of the electrode above the bath surface 15 is adjustable for control of the thickness of the ribbon of glass produced. Single marginal heaters are provided for the pool 26 to regulate the marginal flows 53 which take place around the upstanding parts 118 of the electrode and there are immersed coolers 62 in the molten bath downstream of the electrode and an overhead cooler 57 to ensure stabilisation of the glass foil produced.

As illustrated in FIG. 20 flows of molten glass from the pool 26 take place both above and below the linear part 117 of the electrode. The lower face of the thin glass if formed in contact with the molten metal bath and the upper face of the thin glass is drawn from the fire-polished surface of the molten glass which settles to a flat distortion-free form in the hot pool 26. Heating current flow takes place from the electrode 117 downwardly to the bath surface and the heat generated serves also to heat the flow above the electrode.

In one example of operation for the production of glass 3 mm thick and 400 mm wide the immersed electrode 117 is 480 mm wide and is 12 mm diameter stainless steel rod.

The electrical supplies are connected and regulated as set out in Table VII.

TABLE VII

| Electrode | Volts | Amps | Power kW |
|---|---|---|---|
| Electrode Rod 117 | 10 | 450 | 4.5 |
| Wet-back Electrode 36 | 30 | 250 | 7.5 |
| Right-hand Electrode 43 | 36 | 56 | 2.0 |
| Left-hand Electrode 43 | 35 | 60 | 2.1 |

The 3 mm glass 400 mm wide was produced at the rate of 25 tonnes per week being withdrawn from the bath at a rate of 50 m/hr.

As already stated with reference to FIG. 7 it is advantageous that the undersurface of the electrode bar, apart from the circular cross-section of FIGS. 18 to 20, shall slope upwardly, and that the bottom corners of the bar shall be rounded. The viscosity of the glass flowing beneath the bar is maintained by the heating current at a value which ensures ready release of the glass from the bar.

Figure 21:
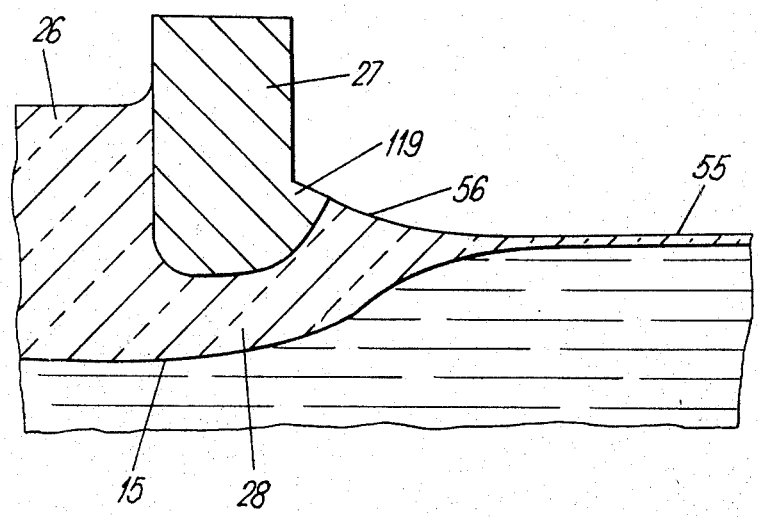
FIG. 21 illustrates in cross-section a special shape of electrode bar for use in holding back the head of molten glass.

The exact location of the release of the meniscus 56 of the glass from the bar can be more accurately located as illustrated in FIG. 21 by shaping the downstream lower edge of the bar as a nose 119 which is wetted by the meniscus 56 of the molten glass.

Figure 22:
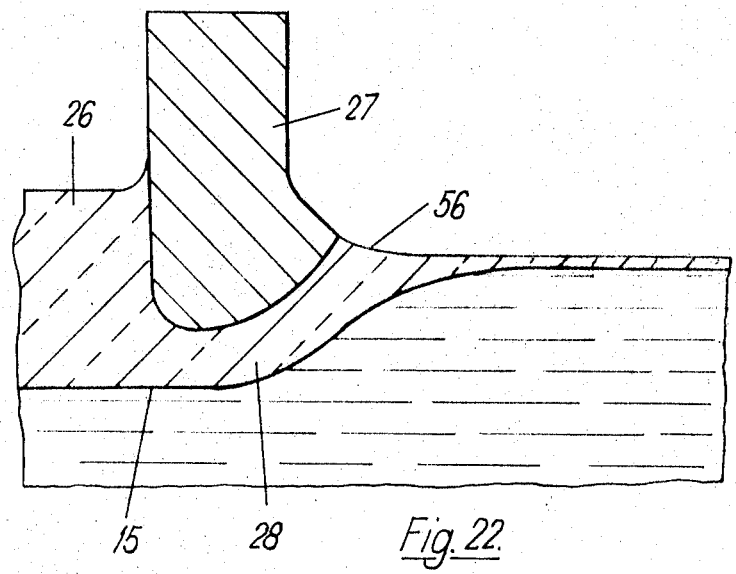
FIG. 22 shows a cross-section through another shape of electrode bar.

Another embodiment is shown in FIG. 22 which has a nose 119 at the downstream edge of an upwardly curving bottom face 120.

Figure 23:
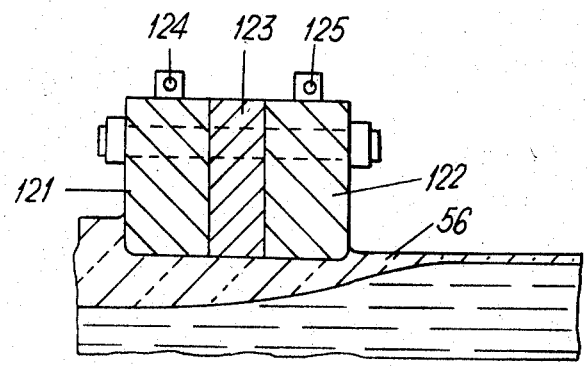
FIG. 23 shows in cross-section a modified form of electrode bar comprising two electrically conductive parts insulated from each other.

Instead of passing the current between the underface of the electrode bar and the surface of the molten bath the electrode construction of FIG. 23 may be used in which the refractory member comprises two parallel bars 121 and 122, usually of molybdenum, separated by a strip-shaped spacer element 123 of insulating refractory material, for example sillimanite. Separate electrical connections indicated at 124 and 125 are made to the two bars 121 and 122. One of these connectors is connected to the variable tapping on a supply autotransformer and the other connector is connected to the neutral side of the winding of that transformer. Electric current flows between the bottom surfaces of the bars 121 and 122 through the glass flowing through the aperture beneath the electrode to heat the glass to the required low viscosity.

In yet another embodiment of the invention the solid member which controls forward flow of molten glass from the pool 26 may be an electrically non-conducting material, for example pure silica, a refractory containing at least 80 percent silica, or an alumino-silicate refractory such as sillimanite, with heating wires buried in the material so that the face of the solid member in contact with the molten glass heats the glass flowing beneath the member to the required low viscosity.

Other refractory materials as well as sillimanite may be used as electrical insulators for the insulating bodies 92 of FIGS. 13 and 14 and the insulating bodies 106 and 108 of FIGS. 16 and 17. Most common aluminasilicates may be used as well as high silica refractories.

In each of the examples of operation described, the electrical power supplies are derived from the normal 50 Hz mains supply. The frequency of the supply may be varied, for example a supply frequency of 500 Hz or 1,000 Hz or higher may be used.

In each embodiment described the thick margins 54 of the ribbon are trimmed as soon as possible after the ribbon has been taken from the bath, giving a continuous ribbon of flat glass or glass foil which can then be further processed. The glass foil, for example may be given a continuous resin coating and then the coated foil is flaked to produce glass flake for use as a reinforcing material for resins or cements.

The invention thus provides a method of producing flat glass of thickness for example from 10 mm down to 1 mm and flat glass of lower thicknesses down to glass foils of thickness 0.005 mm. This enables flat glass and glass foil to be produced with the same plant at very low load and the thickness of the glass produced is varied by varying the traction applied as well as the rate of delivery of glass to the bath and the temperature of the glass as it flows through the heated aperture and is drawn away from the pool of molten glass established at the inlet end of the bath.

We claim:

1. A method of manufacturing flat glass comprising pouring molten glass at a controlled rate on to a bath of molten metal to form a pool of molten glass on the bath, controlling forward flow of molten glass from the pool by means of an elongate member wettable by the molten glass and extending transversely across the downstream end of the pool and contacting the forwardly flowing glass, heating the glass in the region of that member to maintain the forwardly flowing glass in that region at a viscosity which is lower than the viscosity of molten glass of the pool upstream of said member but at a viscosity at which the glass also wets onto said member so as further to regulate that forward flow, drawing a ribbon of glass along the bath from said lower viscosity forwardly flowing glass by accelerating the forward flow by traction applied to the glass ribbon acting against reaction forces distributed across the ribbon width and created by said wetting of the glass on to the member, and cooling the ribbon to condition it for stability at a desired thickness as it is drawn along the bath away from the member.

2. A method according to claim 1 wherein said forward flow of molten glass from the pool is regulated by said member being a linear solid member totally immersed in the molten glass.

3. A method according to claim 1, wherein the member is solid and is an electrode, and comprising performing said heating step by passing an electric current through the glass between the electrode and the molten metal bath, and regulating the current to control the temperature of the glass and thereby regulate its forward flow.

4. A method according to claim 1, wherein the member is solid and is comprised of a pair of electrodes each extending along the length of the member, and comprising performing said heating step by passing electric current between the electrodes through the glass flowing beneath the member to control the temperature of the glass and thereby regulate its forward flow.

5. A method according to claim 1 wherein said forward flow of molten glass from the pool is regulated by said member being a linear solid member contacting and wetted by the surface of the molten glass.

6. A method according to claim 1 wherein said forward flow of molten glass from the pool is regulated by said member being a curved member whose convex surface is engaged by the molten glass pool, and wherein the glass ribbon is drawn away from the member at a velocity which draws the centre of a portion of the ribbon of glass away from the concave surface of the member prior to the formation of the margins of that portion of the ribbon.

7. A method according to claim 1 wherein said forward flow of molten glass from the pool is regulated by said member being a solid member having a linear central part and wing pieces angled in the direction of flow of the glass, and wherein the glass ribbon is drawn away from the solid member at a velocity which draws the centre of a portion of the ribbon of glass away from the linear part of the member prior to the formation of the margins of the ribbon at the ends of the wing pieces.

8. A method according to claim 7, comprising separately supplying electric current to the central part and to the wing pieces of the solid member to provide independent regulation of the temperature of the molten glass drawn into the center and the sides of the ribbon.

9. A method according to claim 1, comprising directing marginal flows of molten glass from the pool around the ends of the member into the margins of the ribbon of glass to form thickened margins which apply lateral constraint to the tendency of the ribbon to narrow.

10. A method according to claim 9, comprising drawing the ribbon of glass away from the member at a velocity such that the ribbon has the form of a ribbon of glass foil with thickened margins, and cooling the ribbon to stiffen the foil immediately as it is formed.

11. A method according to claim 9, comprising separately regulating said marginal flows into the ribbon by heating the margins of the pool of molten glass.

12. A method according to claim 9, wherein said marginal flows of molten glass around the edges of the member are contacted by side extensions of said member, which extensions are wetted by the molten glass.

13. A method according to claim 12, wherein each side extension is an electrode, comprising passing electric current between those extensions and the molten metal bath to provide further thermal regulation of the marginal flows of glass from the pool into the ribbon.

14. A method according to claim 9, comprising engaging the upper surface of the thickened margins of the ribbon to apply laterally constraining forces thereto.

15. Apparatus for manufacturing flat glass comprising a tank structure containing a bath of molten metal, pouring means extending over the bath surface for pouring molten glass to form a pool of molten glass on said bath surface, an elongated solid member of a material wettable by said molten glass, said member being located in the tank structure at a predetermined distance from the pouring means at the downstream end of the pool and being located above the bath surface by an amount sufficient to be in physical contact with the molten glass in said pool, said member being operable to regulate forward flow of molten glass from the pool of molten glass held back on the bath surface by said glass being wetted on to said member, said member including means for heating the glass in the region of that member to maintain forwardly flowing glass in that region at a viscosity which is lower than the viscosity of molten glass of said pool upstream of said member but at a viscosity at which the glass also wets onto said member, traction means positioned for applying tractive force to a ribbon of glass drawn thereby, from said lower viscosity forwardly flowing glass, along the bath surface from said member, and cooling means in the tank structure downstream of the solid member, and positioned at a location corresponding to that location immediately after the ribbon is formed, for conditioning the ribbon to stabilize it at a desired thickness as it is drawn along the path.

16. Apparatus according to claim 15, wherein the tank structure is an elongated structure, the pouring means is constituted as a spout extending over an end wall at one end, the hot end, of the tank structure and having a downwardly sloping lip which ends close to the bath surface, an outlet for the ribbon of glass is defined at the other end of the tank structure, and the solid member is spaced above the bath surface by a distance defining an elongated aperture for flow of molten glass from the pool into the ribbon.

17. Apparatus according to claim 16, wherein the solid member is a bar of a refractory metal, and an electric power supply is connected to the bar and to the molten metal bath in a sense to supply glass-heating current to the bar.

18. Apparatus according to claim 17, wherein the bar is a straight bar fixed parallel to and spaced from the spout lip.

19. Apparatus according to claim 17, wherein the bar is fixed above the bath surface at a height such that an aperture from 7 mm to 18 mm high is defined between the bath surface and the bottom of the bar.

20. Apparatus according to claim 17, wherein the undersurface of the bar slopes upwardly in the direction of glass flow to provide with the bath surface an elongated aperture of varying cross-section.

21. Apparatus according to claim 17, wherein the downstream lower edge of the bar is shaped as a nose which is wetted by the surface of the molten glass and defines the location of meniscus release from the bar.

22. Apparatus according to claim 16, including refractory tiles mounted at the sides of the tank structure in the region upstream of said solid member, electrodes mounted on those tiles to dip into the margins of the pool of molten glass, and electric power supply means connected to those electrodes and to the bath, to supply current for heating marginal flows in the pool.

23. Apparatus according to claim 16, including side extensions of the solid member, the undersurfaces of which extensions are further above the bath surface than the underface of the solid member to provide passages for said marginal flows of molten glass from the pool into the thickened margins of the ribbon.

24. Apparatus according to claim 16, including top rolls mounted in the tank structure downstream of the aperture-defining solid member, to engage the upper surface of the margins of the ribbon of glass and apply width-controlling forces thereto.

25. Apparatus according to claim 16, wherein the solid member comprises two parallel bars of refractory metal separated by a spacer element of insulating material, and the bars have separate electrical connectors for connection to an electric power source.

26. Apparatus according to claim 15, wherein the solid member is a rod of refractory metal which is mounted between end brackets at a distance above the bath surface to ensure total immersion of the rod in the molten glass pool.

27. Flat glass of thickness in the range 0.5 mm to 10 mm produced by pouring molten glass at a controlled rate on to a bath of molten metal to form a pool of molten glass on the bath, controlling forward flow of molten glass from the pool by means of an elongate member wettable by the molten glass and extending transversely across the downstream end of the pool and contacting the forwardly flowing glass, heating the glass in the region of that member to maintain the forwardly flowing glass in that region at a viscosity which is lower than the viscosity of molten glass of the pool upstream of said member but at a viscosity at which the glass also wets onto said member so as further to regulate that forward flow, drawing a ribbon of glass along the bath from said lower viscosity forwardly flowing glass by accelerating the forward flow by traction applied to the glass ribbon acting against reaction forces distributed across the ribbon width and created by said wetting of the glass on to the member, and cooling the ribbon to condition it for stability at a thickness in said range as it is drawn along the bath away from the member.

28. Glass foil of thickness in the range 0.005 mm to 0.5 mm produced by pouring molten glass at a controlled rate on to a bath of molten metal to form a pool of molten glass on the bath, controlling forward flow of molten glass from the pool by means of an elongate member wettable by the molten glass and extending transversely across the downstream end of the pool and contacting the forwardly flowing glass, heating the glass in the region of that member to maintain the forwardly flowing glass in that region at a viscosity which is lower than the viscosity of molten glass of the pool upstream of said member but at a viscosity at which the glass also wets onto said member so as further to regulate that forward flow, drawing a ribbon of glass along the bath from said lower viscosity forwardly flowing glass by accelerating the forward flow of traction applied to the glass ribbon acting against reaction forces distributed across the ribbon width and created by said wetting of the glass on to the member, directing marginal flows of molten glass from the pool around the ends of the member into the margins of the ribbon of glass to form thickened margins, setting the velocity at which said ribbon is drawn away from the member to produce a ribbon of glass foil of thickness in said range and having said thickened margins, and cooling the ribbon to stiffen the foil immediately as it is formed.

29. In a method of manufacturing thin flat glass wherein molten glass is poured at a controlled rate on to a bath of molten metal to form, on the bath, a pool of molten glass which flows forwardly into a ribbon of glass that is drawn along the bath by traction applied to the ribbon and that is cooled while traction is applied, the improvement comprising:

contacting the forwardly flowing glass in the pool of molten glass with an elongate member extending transversely across the downstream end of the pool and wettable by the molten glass of the pool;

heating the glass in the region of said member, by heating said member, to maintain said forwardly flowing glass in that region at a viscosity which is lower than the viscosity of molten glass of the pool upstream of said member but at a viscosity at which the glass also wets on to said member; and drawing said ribbon from said lower viscosity forwardly flowing glass;

said wetting of the glass on to said member being operable to establish, at the location of contact of said member in the pool of molten glass, viscous drag reaction forces distributed across the ribbon width and acting against said applied traction.

30. Apparatus according to claim 16, including side extensions of the solid member, the undersurface of which extensions are further above the bath surface than the underface of the solid member to provide passages for marginal flows of molten glass from the pool into thickened margins of the ribbon.

31. Apparatus according to claim 17 wherein the bar is of curved form and is fixed with its convex surface facing and spaced from the spout lip.

32. Apparatus according to claim 17 wherein the bar has a straight central part parallel to and spaced from the spout lip, and wing pieces fixed to the ends of the central part and angled in the direction of flow of the glass.

33. Apparatus according to claim 32, wherein the wing pieces are fixed to the central part by electrical insulators, and separate electrical connections are provided from the power supply to the central part and each of the wing pieces.

34. Apparatus according to claim 30, wherein the side extensions are of an electrically conductive material wetted by molten glass, are electrically insulated from the solid member and are individually connected to electric power supply means.

* * * * *